United States Patent
Burns et al.

(10) Patent No.: US 10,924,388 B1
(45) Date of Patent: Feb. 16, 2021

(54) MULTI-PATH ROUTING

(71) Applicant: Amazon Technologies, Inc., Seattle, WA (US)

(72) Inventors: Nathan Lee Burns, Mountain View, CA (US); Bin Wang, Fremont, CA (US); Scott Wright Heath, Fairfax, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/818,670

(22) Filed: Nov. 20, 2017

Related U.S. Application Data

(63) Continuation of application No. 14/861,895, filed on Sep. 22, 2015, now Pat. No. 9,825,846.

(51) Int. Cl.
*H04L 12/707* (2013.01)
*H04L 12/26* (2006.01)
*H04L 29/06* (2006.01)
*H04L 12/927* (2013.01)

(52) U.S. Cl.
CPC .......... *H04L 45/24* (2013.01); *H04L 43/0829* (2013.01); *H04L 47/805* (2013.01); *H04L 69/16* (2013.01)

(58) Field of Classification Search
CPC ..................... H04L 43/00; H04L 43/08; H04L 43/0852–0864; H04L 43/0876–0894
See application file for complete search history.

(56) References Cited

U.S. PATENT DOCUMENTS

| | | | | |
|---|---|---|---|---|
| 6,363,056 B1 * | 3/2002 | Beigi | ...................... | H04L 41/12 370/252 |
| 7,154,416 B1 * | 12/2006 | Savage | ................... | H03M 7/30 341/51 |
| 8,811,172 B1 * | 8/2014 | Sella | ....................... | H04L 41/12 370/230 |
| 9,197,537 B2 * | 11/2015 | Swanson | ........... | H04L 29/08081 |
| 2009/0041015 A1 * | 2/2009 | Zhang | ..................... | H04L 45/00 370/392 |
| 2009/0074156 A1 | 3/2009 | Ku et al. | | |
| 2009/0080336 A1 * | 3/2009 | Zhang | ..................... | H04L 43/00 370/248 |

(Continued)

*Primary Examiner* — Robert C Scheibel
(74) *Attorney, Agent, or Firm* — Knobbe, Martens, Olson & Bear, LLP

(57) ABSTRACT

Systems and methods are provided for dynamically routing packets using multi-flow and multi-path multiplexing connections. A first computing device and second computing device communicate via a plurality of data flows, which may be routed across various network paths. Each flow is defined by a set of network addresses, a set of ports, and a protocol specification, such as UDP. The second device sends information to the first device regarding the various data flows. The first device may send probing packets to facilitate collecting data flow information. Information may include latency, packet loss, and other values. Based on the information received, the first device may select or prioritize data flows to mitigate congestion, and address performance criteria. The first device may also transmit information regarding selected data flows to other devices, allowing the other devices to utilize a selected data flow even if they lack multiplexing capability.

19 Claims, 14 Drawing Sheets

(56) References Cited

U.S. PATENT DOCUMENTS

| | | | |
|---|---|---|---|
| 2009/0122697 A1* | 5/2009 | Madhyasha | H04L 41/12 370/229 |
| 2009/0276530 A1* | 11/2009 | Gentry | H04L 12/5692 709/227 |
| 2010/0124196 A1* | 5/2010 | Bonar | H04B 7/0689 370/329 |
| 2011/0096668 A1* | 4/2011 | Bloch | H04L 45/38 370/237 |
| 2011/0096732 A1* | 4/2011 | Rashid | H04L 47/10 370/329 |
| 2012/0188949 A1 | 7/2012 | Salkintzis | |
| 2014/0185519 A1* | 7/2014 | Zhang | H04W 40/248 370/328 |
| 2014/0379937 A1* | 12/2014 | Hughes | H04L 43/0894 709/240 |
| 2015/0156122 A1* | 6/2015 | Singh | H04L 47/20 370/235 |
| 2015/0195326 A1 | 7/2015 | Suryavanshi et al. | |
| 2015/0381486 A1* | 12/2015 | Xiao | H04L 45/70 370/237 |

* cited by examiner

MULTI-PATH ROUTING

CROSS-REFERENCE TO RELATED APPLICATION

This application is a continuation of U.S. patent application Ser. No. 14/861,895, now U.S. Pat. No. 9,825,846 entitled MULTI-PATH ROUTING and filed Sep. 22, 2015, the entirety of which is incorporated herein by reference.

BACKGROUND

Generally described, computing devices and communication networks can be utilized to exchange information. In a common application, a computing device can request content from another computing device via the communication network. For example, a user at a personal computing device can utilize a software application process, typically referred to as a browser, to request a Web page from a server computing device via the Internet. In such embodiments, the user computing device can be referred to as a client computing device, and the server computing device can be referred to as a content provider.

Resource providers are also generally motivated to provide requested resources to client computing devices often with consideration of efficient transmission of the requested resource to the client computing device or consideration of a latency associated with the transmission of the requested resource. For larger scale implementations, a resource provider may receive resource requests from a high volume of client computing devices which can place a strain on the resource provider's computing resources. Additionally, the resource requested by the client computing devices may have a number of components, which can further place additional strain on the resource provider's computing resources.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1A:
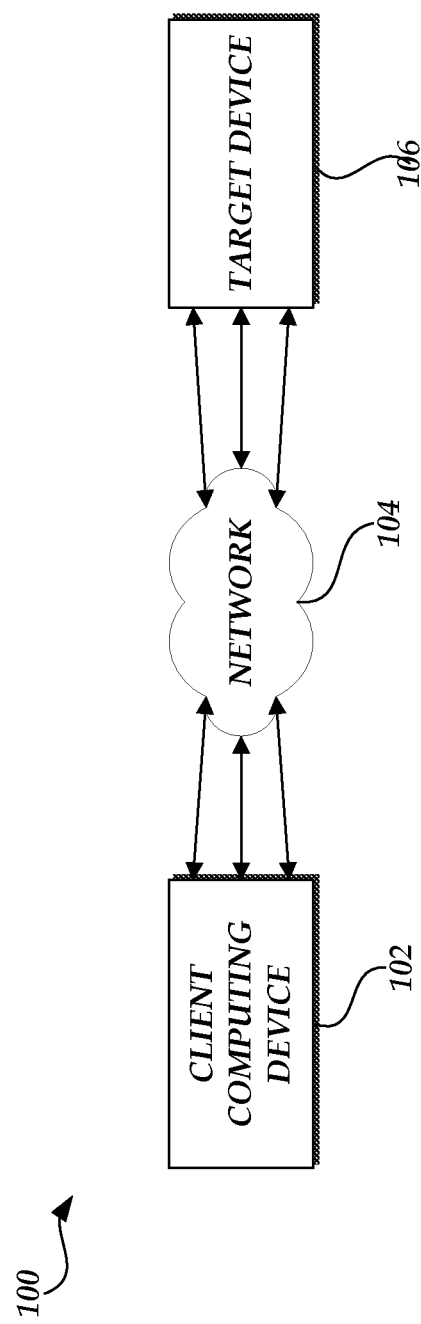
FIG. 1A is a block diagram of a computing environment illustrating a multi-path connection between a client computing device and a target device.

Generally described, the present application relates to routing of data communications via a communication network. More specifically, aspects of the present application relate to the establishment and prioritization of a multiple data flows between two computing devices to facilitate data communications. In one aspect, two computing devices may establish multiple data flows in which each data flow defined by two network addresses (a source network address and a destination network address), source and destination communication ports, and a communication protocol. Illustratively, the communication protocol can correspond to a user datagram protocol or "UDP" and the data flows will be characterized as UDP data flows. Generally, a data flow is a sequence of packets transmitted from one computing device to another. For example, a data flow may be a sequence of packets sent from the source network address, using the source communication port, to the destination network address and the destination communication port. A UDP data flow sends its packets according to the user datagram protocol.

For purposes of illustration, one of the two computing devices can be referred to as a client computing device and a second of the two computing devices can be referred to as a target computing device. After establishment of the multiple data flows between the client computing device and the target computing device, the client computing device can transmit data communications, such as a probing packet, to the target computing device. The data communications are configured to elicit a response from the target computing device. Based on the received response, or information included in the response, the client computing device can prioritize the established data flows based on latency of communications or data throughput. The client computing device can then select a data flow, such as a UDP data flow, in which to establish further data communications, such as real time data communications associated with multi-media content. Additionally, the client computing device can then further utilize additional event criteria, such as time expired or data transmitted, to repeat the transmission and processing of a probing packet data communication and determine an updated UDP data flow for continued data communications.

In further embodiments, the target computing device can implement the same process with regard to data communications between the target computing device and the client computing device. In this embodiment, the target computing device can asynchronously select a data flow, such as a UDP data flow, for establishing bi-directional data communications between the two computing devices. In this embodiment, the target computing device can implement a multi-path routing routine independently and update independently based on evaluated event criteria.

In accordance with another aspect of the present application, a client computing device can establish data communications with a target computing devices via a network of intermediate computing devices that form a network path. In accordance with this embodiment, the client computing device can utilize the singular communication routing path (e.g., no multi-path routing) or bi-directional multi-path routing process described above for data communications between the client computing device and a first target intermediate computing device. Additionally, each target intermediate computing device can further implement the multi-path routing process along each intermediate path defined to reach the target computing device. For a service provider implementing various physical points of presence in a wide area network, such as the Internet, one or more of the points of presence can implement an intermediate computing device to facilitate in the routing of data communications. Through the independent utilization of the multi-path routing process within the intermediate computing devices, the intermediate computing devices can update the network path for continuous data communications and attempt to mitigate network congestion.

In accordance with yet another aspect of the present application, a first client computing device can establish data communications with other computing devices via a network of target computing devices that form a network path. In accordance with this embodiment, the first client computing device can utilize the singular or bi-directional multi-path routing process described above for data communications between the client computing device and a first target. Additionally, one or more additional client computing devices may be in communication with the first client computing device, directly or indirectly, for purposes of implementing the processing results or information utilized in generating the processing results based on the implementation of the multi-path routing process. The one or more additional client computing devices may utilize the processing results or processing results information without independently implementing the multi-path routing process or without having the capability of implementing the multi-path routing process. The one or more additional client computing devices may be associated with the first client computing device, such as in accordance with geographical or network information, such that the determined multi-path routing information would likely be applicable to the one or more additional client computing devices.

The foregoing aspects and many of the attendant advantages will become more readily appreciated as the same become better understood by reference to the following description of illustrative embodiments, when taken in conjunction with the accompanying drawings depicting the illustrative embodiments. The illustrative embodiments described below do not necessarily imply that any combination of features is required. Additionally, in some embodiments, the features of the illustrative embodiments can be combined.

FIG. 1A is a block diagram of a computing environment 100 illustrating a multi-path connection between two computing devices. Illustratively, one or more aspects of the present disclosure will be described with regard to implementation on a computing device. Those skilled in the art will recognize that the computing devices may be any of a number of computing devices that are capable of communicating over a network including, but not limited to, a laptop, personal computer, personal digital assistant (PDA), hybrid PDA/mobile phone, mobile phone, smartphone, wearable computing device, electronic book reader, digital media player, tablet computer, gaming console or controller, kiosk, augmented reality device, other wireless device, set-top or other television box, and the like.

For purposes of illustration, FIG. 1A will be described with regard to a client computing device 102 and a target computing device 106. Illustratively, client computing device 102 may be viewed as an originator of a request, such as a multi-media request, that can be fulfilled, at least in part by the target computing device 106, also referred to as a source computing device. However, FIG. 1A should not be considered to be limited to communications between client computing devices and target/source computing devices. In that regard, the two computing devices illustrated in FIG. 1A may be both of the same type (e.g., peer client computing devices, intermediate computing devices, etc.) or different types of devices.

The client computing device 102 may be directly connected to a communication network via a wired connection or may be in communication with a base station via a wireless or cellular connection, generally referred to as network 104. In addition, the network may be a personal area network, local area network, wide area network, over-the-air broadcast network (e.g., for radio or television), cable network, satellite network, cellular telephone network, or combination thereof. For example, the network may be a publicly accessible network of linked networks, possibly operated by various distinct parties, such as the Internet. In some embodiments, the network may be private or semi-private networks, such as a corporate or university intranets. The network may include one or more wireless networks, such as a Global System for Mobile Communications (GSM), a Code Division Multiple Access (CDMA) network, a Long Term Evolution (LTE) network, or some other type of wireless network. The network may use protocols and components for communicating via the Internet or any of the other aforementioned types of networks. Protocols and components for communicating via the Internet or any of the other aforementioned types of communication networks are well known to those skilled in the art and, thus, are not described in more detail herein.

As depicted in FIG. 1A, the client computing device 102 and the target computing device 106 form a plurality of data flows, which are defined or characterized by the network addresses of the two computing devices, a communication port and a specified communication protocol. By varying the information in the definition of the data flow, the two computing devices can establish multiple data flows for possible data communications between the computing devices. As will be discussed in greater detail below, each computing device may dynamically select one or more data flows for purposes of transmitting subsequent data communications based on latency information.

Figure 1B:
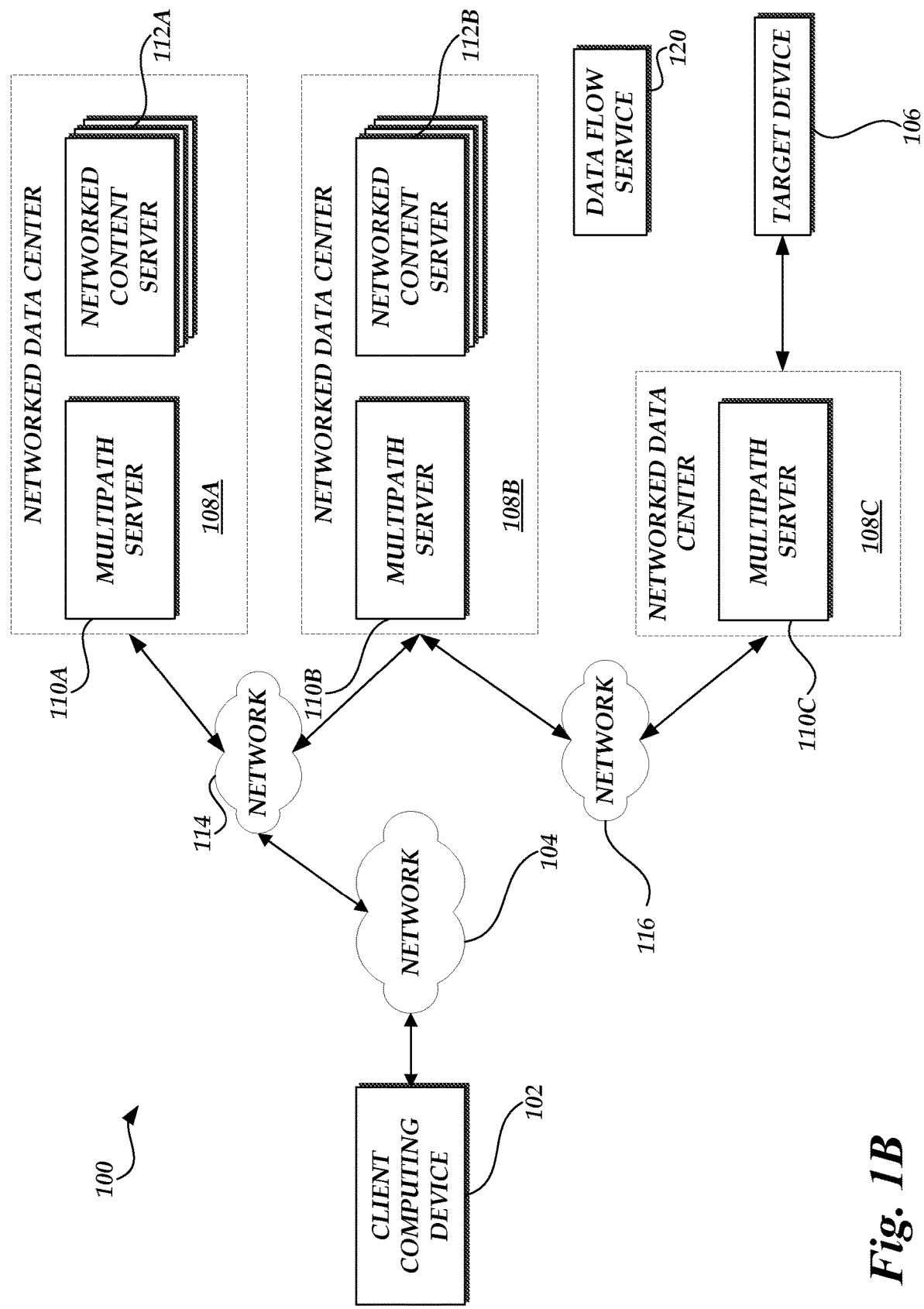
FIG. 1B is a block diagram of a computing environment illustrating a multi-path connection between a client computing device and multiple target devices to form a network path.

FIG. 1B is a block diagram of a computing environment 100 illustrating a multi-path connection between a client computing device and multiple target devices to form a network path. More specifically, FIG. 1B corresponds to an embodiment in which a client computing device 102 can utilize a network path made up of intermediate computing devices to reach a target computing device 106. In one embodiment, the client computing device 102 and the target computing device 106 may utilize a multi-path routing process to communicate with the intermediate computing devices. By way of example, client computing device 102 can utilize network connection 104. In another embodiment, the client computing device 102 or the target computing device 106 may utilize more traditional communication routing techniques to communicate with the intermediate computing devices. In these embodiments, the intermediate computing devices may then utilize multi-path routing, as described below, to determine the routing path for data communications independent of whether the client computing device 102 and the target computing device 106 are also utilizing multi-path routing.

With continued reference to FIG. 1B, the computing environment can include a number of additional target computing devices 108A-C, or intermediate computing devices, that may be utilized to facilitate the transmission of data communication to the end target computing device 106. Illustratively, the target computing devices 108A-C may be networked data centers that correspond to various physical points of presence. Accordingly, FIG. 1B illustrates a logical grouping of the target computing devices (108A, 108B, 108C), which may be physically remote from each other. As illustrated in FIG. 1B, the target computing devices 108A-C may each be associated with different network connections 114, 116 that may yield different routing paths or data flows between the target computing devices. While three target computing devices 108A-C are illustrated in FIG. 1B, one skilled in the relevant art will appreciate that any number of target computing devices may be utilized. Additionally, a service provider may implement multiple target computing devices (or points of presence), some of which may not necessarily be utilized in data communications.

As further illustrated in FIG. 1B, the target computing devices 108 include one or more multi-path servers or multi-path service components that are operable to receive communications from another device, establish multiple data flows and select one or more data flows for subsequent data communications in a manner described herein. In some embodiments, the target computing devices 108 may also have additional components, such as networked content servers 112, that provide different or alternative functionality. As also depicted in FIG. 1B, one or more of the target computing devices 108 may have a specified function to host the multi-path server or multi-path service. In this implementation, the target computing device 108C may be synonymous with the multi-path server or multi-path service 110C.

With continued reference to FIG. 1B, in some embodiments, the target computing devices 108 may utilize the multi-path server 110 to select one or more data flows for data communications between the client computing device 102 and the target computing device 106, as illustrated. Additionally, in some aspects, the target computing devices 108 can further publish the selection of data flows to a data flow service 120 that can record or otherwise track data flow selection. For example, the data flow service 120 may utilize the selected data flow information to generate a representation of data congestion or characterize data congestion between target computing devices 108, sometimes referred to as Internet weather. In other implementations, the target computing devices 108 may attempt to select and reserve data flows for future data communications. Accordingly, the target computing device 108 can transmit the selection information for purposes of establishing requests or reservations for the selected data flows. The reservation requests may be transmitted to the data flow service 120, which may manage data flow selection, or to one or more additional services, such as a traffic management component.

Figure 1C:
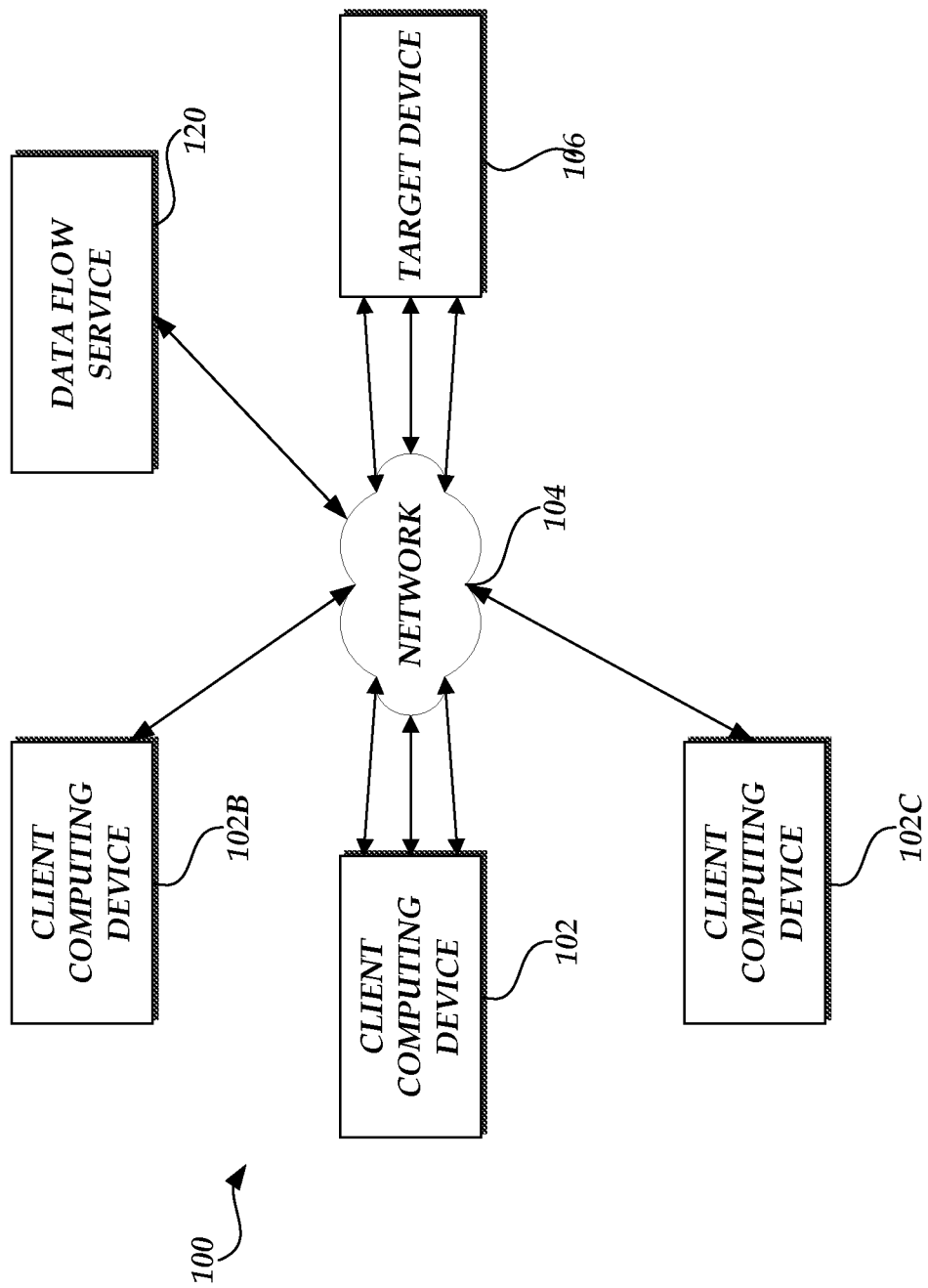
FIG. 1C is a block diagram of a computing environment illustrating the utilization of multi-path routing information by multiple client computing devices.

Turning now to FIG. 1C, a block diagram of a computing environment 100 illustrating the utilization of multi-path routing information by multiple client computing devices 102 will be described. In this embodiment, a first client computing device 102 may implement a multi-path routing process in the manner described in the various embodiments of FIG. 1A. Additionally, as depicted in FIG. 1C, one or more client computing devices 102B, 102C may also utilize a portion of the multi-path information or underlying collected information for purposes of leveraging the data flow selected by the client computing device 102. In some embodiments, the client computing devices 102B, 102C may not be configured with the capability to independently conduct the multi-path routing processes described herein. In other embodiments, the client computing devices 102B, 102C may or may not have such multi-path routing capabilities, but leverage the processes or information utilized by the client computing device 102.

Similar to the service depicted in FIG. 1B, the computing environment 100 includes a data flow service 120 that can record or otherwise track data flow selection by the client computing device 102. The data flow service 120 can publish the data flow selection information to the other client computing devices 102B, 102C. In other embodiments, the client computing device 102 can communicate directly with the other client computing devices 102B, 102C. By way of example, the client computing device 102 can utilize separate or additional communication networks or communication network protocols to transmit the data flow selection or data flow selection information.

Figure 2A:
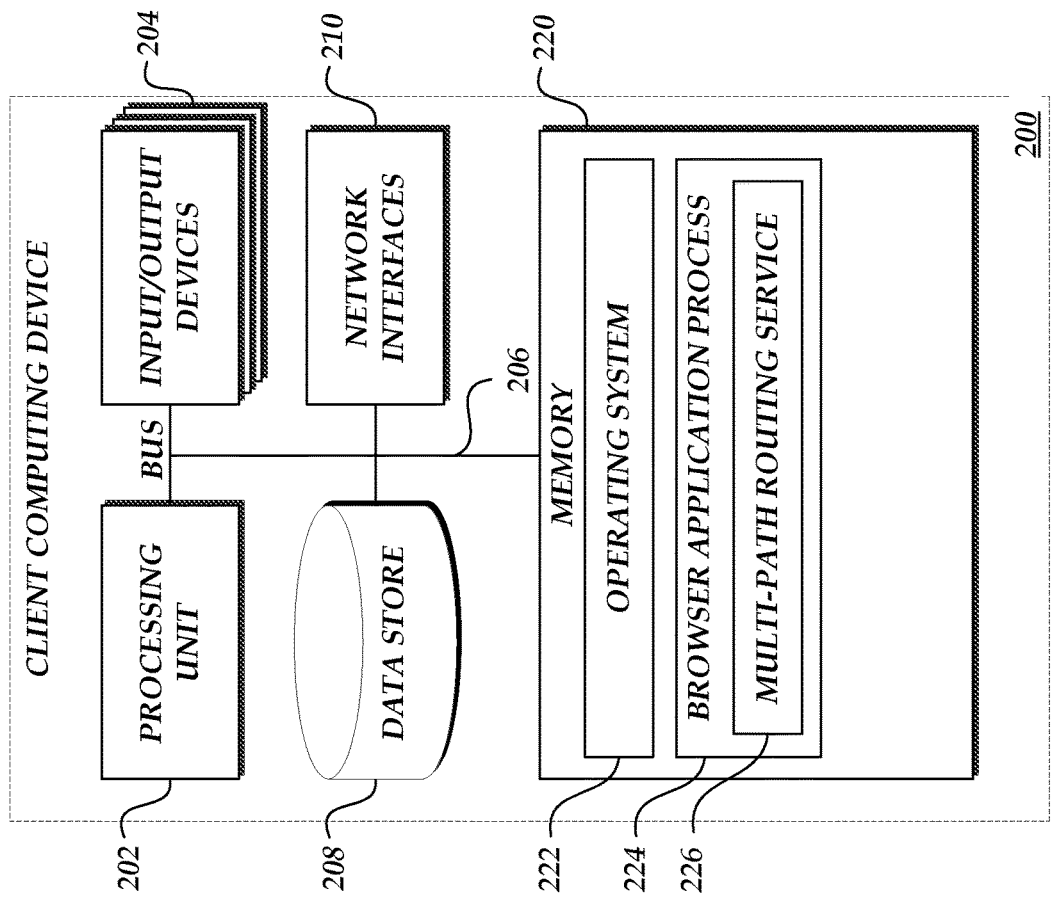
FIG. 2A is a block diagram of a computing device including a multi-path routing service for determining multi-path routing information in accordance with an illustrative embodiment.

FIG. 2A depicts a general architecture of a computing device 200 configured to implement one or more aspects of the multi-path routing techniques according to various embodiments. The general architecture of the computing device 200 depicted in FIG. 2A includes an arrangement of computer hardware and software components that may be used to implement aspects of the present disclosure. The computing device 200 may include many more (or fewer) elements than those shown in FIG. 2A. It is not necessary, however, that all of these generally conventional elements be shown in order to provide an enabling disclosure. As illustrated, the computing device 200 includes a processing unit 202, a set of one or more network interfaces 210, a computer readable medium drive 208, and an input/output device interface 204, all of which may communicate with one another by way of a communication bus 206. The input/output device interface 204 may also accept input from the optional input devices, such as a keyboard, mouse, digital pen, microphone, touch screen, gesture recognition system, voice recognition system, image recognition through an imaging device (which may capture eye, hand, head, body tracking data or placement), gamepad, accelerometer, gyroscope, or other input device known in the art. Likewise, the input/output device interface 204 may also generate outputs, directly or indirectly, to various output devices, such as displays, other computing devices, etc.

The network interfaces 210 may provide connectivity to one or more networks or computing systems. For example, the processing unit 202 may receive or send information and instructions from/to other computing systems or services via one or more networks. In some embodiments, the processing unit 202 may also be associated with functionality that allows for the independent processing of execution instructions in parallel. For example, in one embodiment, the processing unit 202 may correspond to a single computing component having multiple independent actual processing units, often referred to as "cores." As will be explained in greater detail, in some aspects, the ability for a computing device to being processing cached images may depend, at least in part, on availability of one or more cores for processing cached images.

The processing unit 202 may also communicate to and from a memory 220. The memory 220 may include computer- or processor-executable instructions (grouped as modules or components in some embodiments) that the processing unit 202 may execute in order to implement one or more embodiments. The memory 220 may generally include random-access memory ("RAM"), read-only memory ("ROM"), or other persistent, auxiliary, or non-transitory computer-readable media. The memory 220 may store an operating system 222 that provides computer program instructions for use by the processing unit 202 in the general administration and operation of the computing device 200. The memory 220 may further include computer program instructions and other information for implementing aspects of the present disclosure.

In some embodiments, if the computing device 200 is configured as a client computing device, the memory 220 may include a browser application 224, which may be executed by the processing unit 202 to perform operations according to various embodiments. In accordance with an illustrative embodiment, one or more aspects of the present disclosure will be described with regard to the execution of the browser application 224, such as for executing requests for real time communications to access multi-media content. However, reference to the browser application 224 does not necessarily require any specific configuration of a browser application and may be implemented by components having less than full browser functionality. Further, for ease of description, while various embodiments described herein refer to the browser application 224, one or more aspects of the present application may be implemented with various computer-executable applications and are not necessarily limited to implementation solely by the browser application 224.

Additionally, in some embodiments, the computing device 200 may include one or more additional software modules or executable components that can be executed by the processing unit 202 and that implement at least some of the aspects discussed herein. More specifically, as illustrated in FIG. 2A, the computing device 200 can include a multi-path routing service component 226 for facilitating the determination of multi-path routing information for the computing device. As illustrated in FIG. 2A, the multi-path routing service component 226 may be integrated as a component of the browser application 224. In other embodiments, the multi-path routing service component 226 may be a stand-alone component executed by the computing device 200. Still further, in embodiments in which the computing device does not include a browser application 224, the multi-path routing service component 226 would still be implemented as a stand-alone component or integrated with another application or service component.

Further, in some embodiments, the above description of the computing device 200 may also be applied to various other computing devices, such as server computing devices. In such embodiments, the one or more computing devices 200 may include the components discussed above and may be configured to perform operations described with reference to the various embodiments.

Figure 2B:
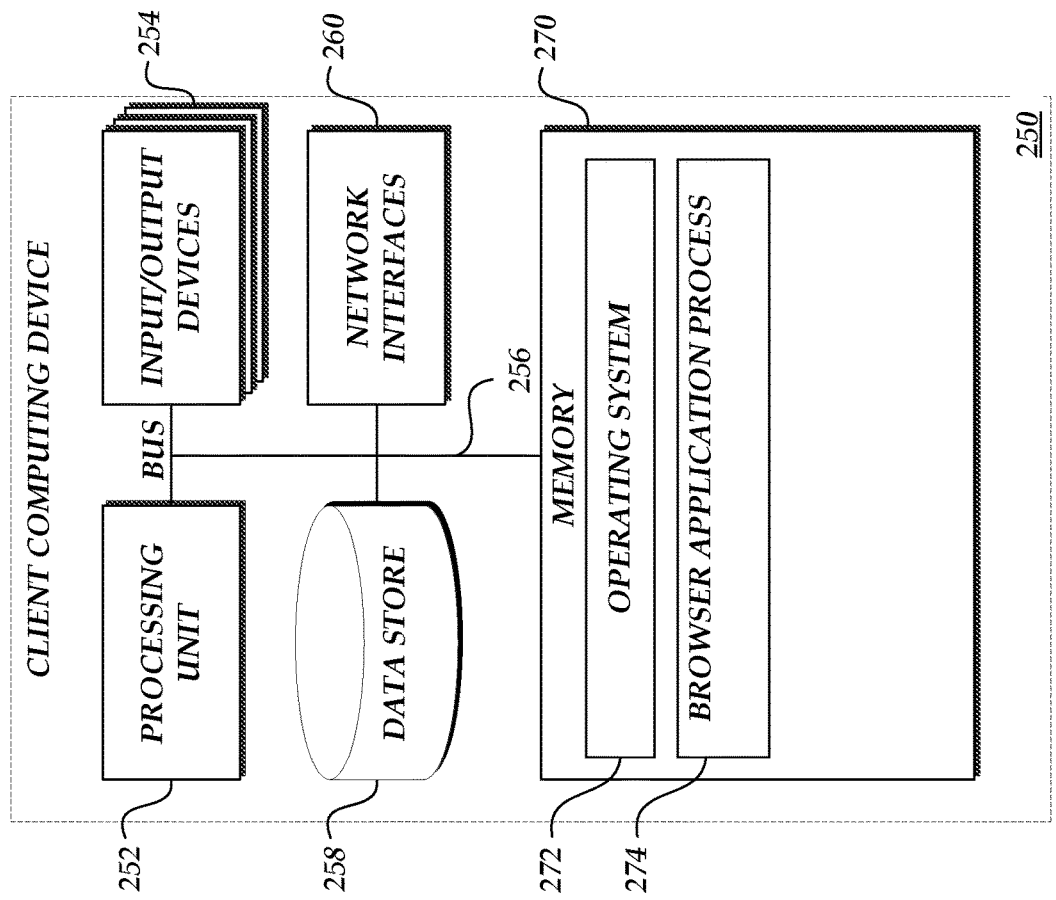
FIG. 2B is a block diagram of a computing device including a browser application for utilizing multi-path routing information provided by another client computing device.

FIG. 2B depicts a general architecture of a computing device 250 configured to implement one or more aspects of the multi-path routing techniques according to various embodiments. The general architecture of the computing device 250 depicted in FIG. 2B includes an arrangement of computer hardware and software components that may be used to implement aspects of the present disclosure. More specifically, the computing device 250 illustrates the components of a computing device that may utilize multi-path routing information provided by another computing device, such as the computing device 200 (FIG. 2A), without necessarily having a separate multi-path routing service component or otherwise not utilizing an included multi-path routing service component.

The computing device 250 may include many more (or fewer) elements than those shown in FIG. 2B. It is not necessary, however, that all of these generally conventional elements be shown in order to provide an enabling disclosure. As illustrated, the computing device 250 includes a processing unit 252, a set of one or more network interfaces 260, a computer readable medium drive 258, and an input/output device interface 254, all of which may communicate with one another by way of a communication bus 256. The input/output device interface 254 may also accept input from the optional input devices, such as a keyboard, mouse, digital pen, microphone, touch screen, gesture recognition system, voice recognition system, image recognition through an imaging device (which may capture eye, hand, head, body tracking data or placement), gamepad, accelerometer, gyroscope, or other input device known in the art. Likewise, the input/output device interface 254 may also generate outputs, directly or indirectly, to various output devices, such as displays, other computing devices, etc.

The network interface 260 may provide connectivity to one or more networks or computing systems. For example, the processing unit 252 may receive or send information and instructions from/to other computing systems or services via one or more networks. In some embodiments, the processing unit 252 may also be associated with functionality that allows for the independent processing of execution instructions in parallel. For example, in one embodiment, the processing unit 252 may correspond to a single computing component having multiple independent actual processing units, often referred to as "cores." As will be explained in greater detail, in some aspects, the ability for a computing device to being processing cached images may depend, at least in part, on availability of one or more cores for processing cached images.

The processing unit 252 may also communicate to and from a memory 270. The memory 270 may include computer- or processor-executable instructions (grouped as modules or components in some embodiments) that the processing unit 252 may execute in order to implement one or more embodiments. The memory 270 may generally include random-access memory ("RAM"), read-only memory ("ROM"), or other persistent, auxiliary, or non-transitory computer-readable media. The memory 270 may store an operating system 272 that provides computer program instructions for use by the processing unit 252 in the general administration and operation of the computing device 250. The memory 270 may further include computer program instructions and other information for implementing aspects of the present disclosure.

In some embodiments, if the computing device 250 is configured as a client computing device, the memory 270 may include a browser application 274, which may be executed by the processing unit 252 to perform operations according to various embodiments. In accordance with an illustrative embodiment, one or more aspects of the present disclosure will be described with regard to the execution of the browser application 274, such as for executing requests for real time communications to access multi-media content.

However, reference to the browser application 274 does not necessarily require any specific configuration of a browser application and may be implemented by components having less than full browser functionality. Further, for ease of description, while various embodiments described herein refer to the browser application 274, one or more aspects of the present application may be implemented with various computer-executable applications and are not necessarily limited to implementation solely by the browser application 274. Additionally, as will be explained in greater detail below, in some embodiments, the computing device 250 may transmit requests for, or otherwise receive, multi-path routing information from another computing device, such as a computing device 200 (FIG. 1A) without implementing a multi-path routing routine independently.

Figure 3A:
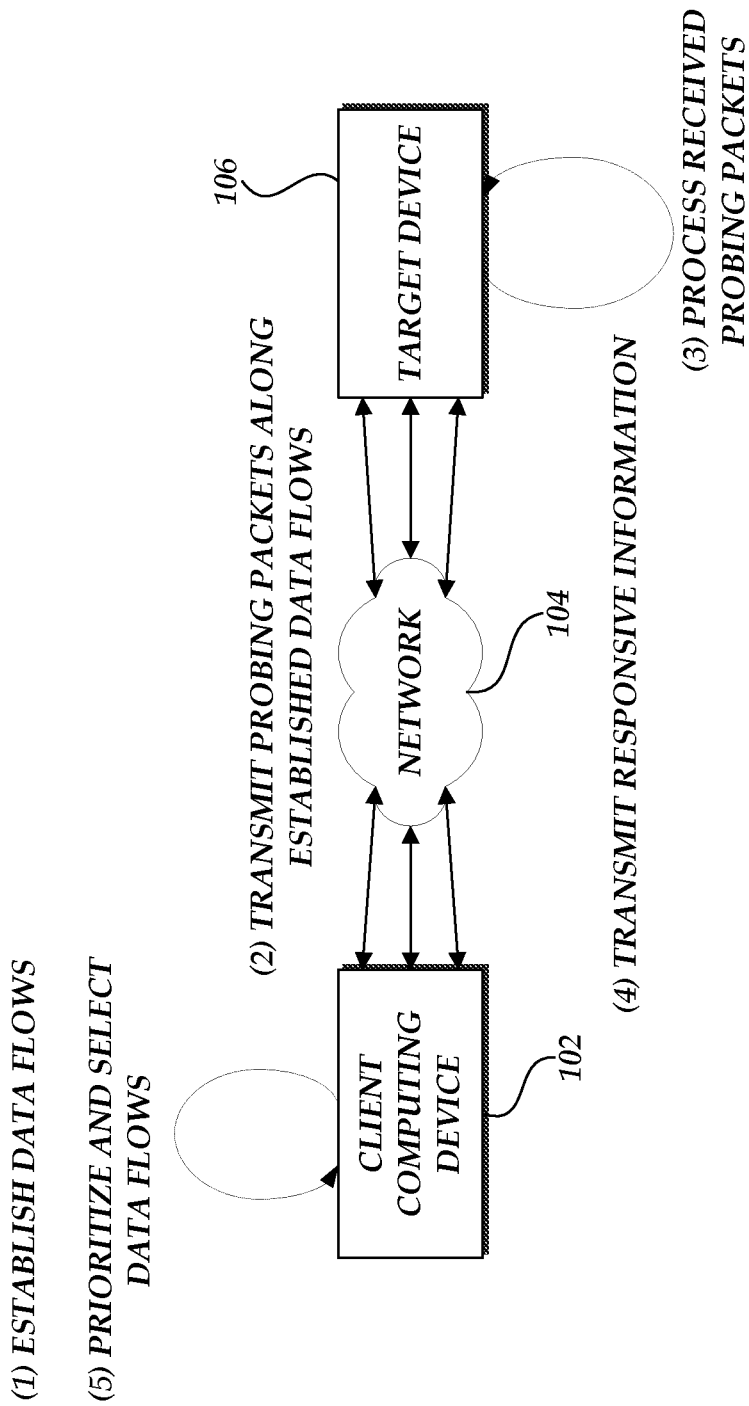
FIGS. 3A-3C are block diagrams of the computing environment of FIG. 1 illustrating the establishment of bi-directional multi-path routing between a client computing device and a target device.
Figure 3B:
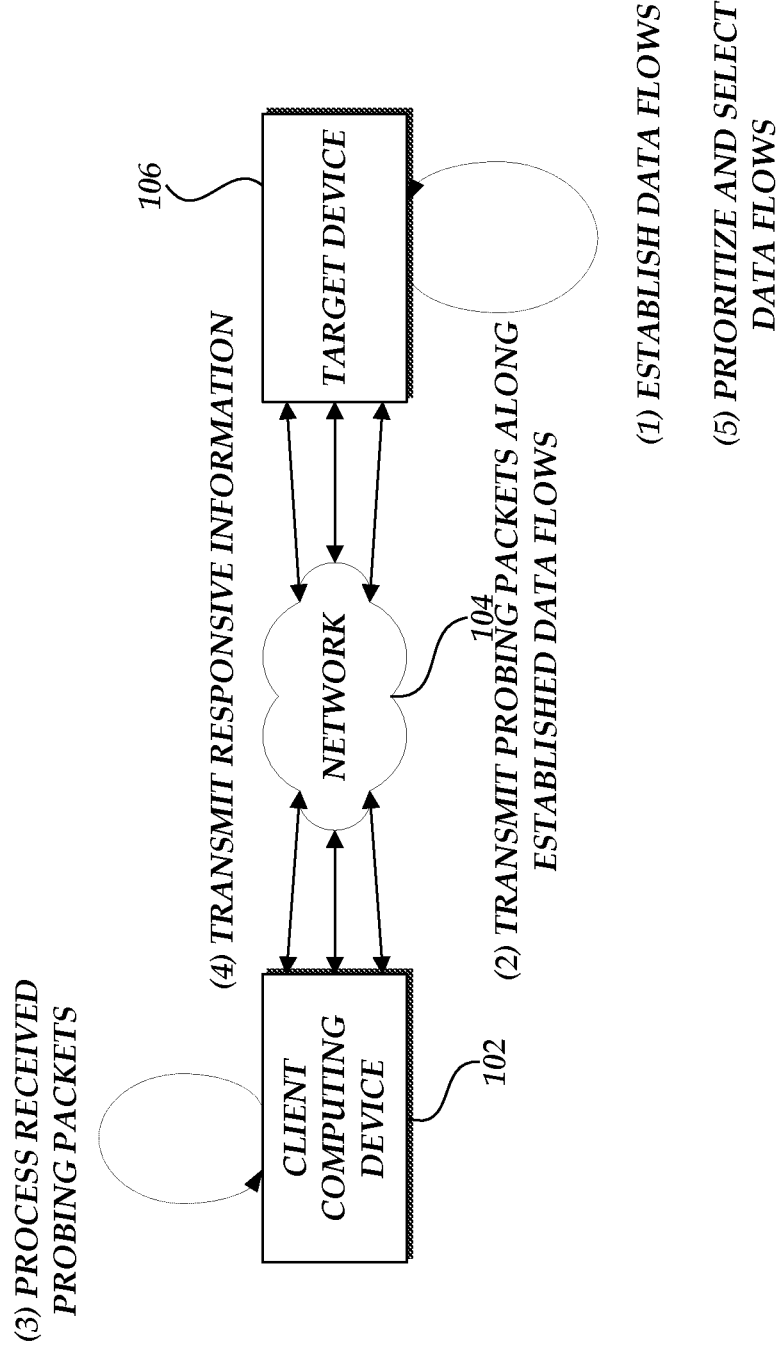
Figure 3C:
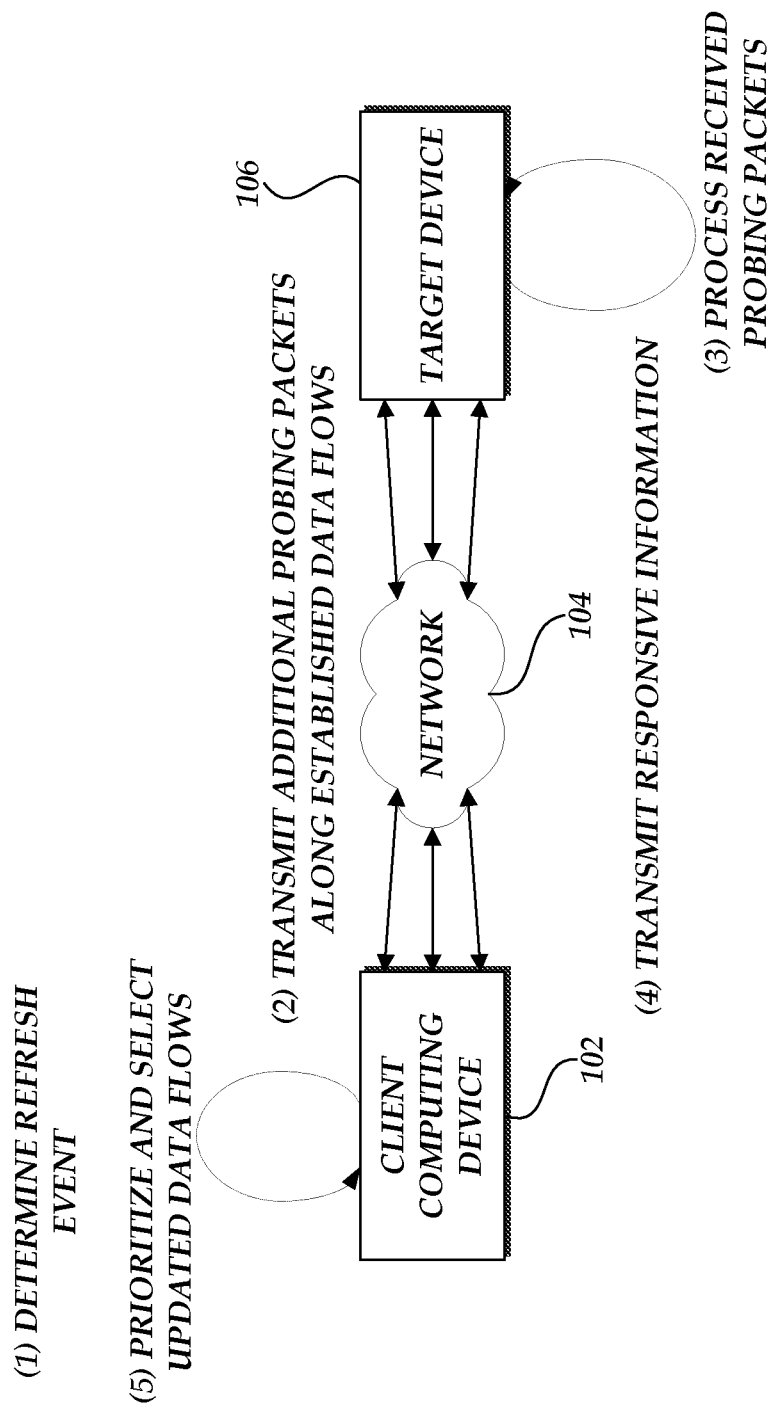

With reference now to FIGS. 3A-3C, an illustrative interaction between a client computing device 102 and a target computing device 106 utilizing multiple data flows will be described. As described with regard to FIG. 1A, the client computing device 102 may be viewed as an originator of a request, such as a multi-media request, that can be fulfilled, at least in part by the target computing device 106, also referred to as a source computing device. However, FIGS. 3A-3C should not be considered to be limited to communications between client computing devices and target/source computing devices.

With reference to FIG. 3A, at (1), the client computing device 102 establishes a plurality of data flows with the target device 106. As previously described, the data flow can be defined in terms of a set of network addresses, a source address and a destination address, a communication port and a communication protocol. Illustratively, the multiple data flows may be established as UDP data flows. Illustratively, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At (2), the client computing device 102 transmits one or more data communications that will elicit a response from the target computing device 106. Illustratively, the elicited response will be utilized by the client computing device 102 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The client computing device 102 can transmit the probing packet with various tracking or identification, such as packet identifiers, computing device identifiers, communication type identifiers, and the like.

At (3), the target computing device 106 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the target computing device 106 transmits responsive information.

At (5), the client computing device 102 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the client computing device 102 can also maintain timestamp information or other tracking information locally, such as in a table, that facilitates the measure of latency or other communication attributes.

At (5), the client computing device 102 prioritizes the one or more data flows based on the received information. In one embodiment, the prioritization of data flows may be based on a calculated latency or other network characteristic, such as data throughput, for the particular probing packet transmitted by the client computing device 102 and tracked with a unique identifier. Additionally, in some embodiments, the client computing device 102 may also utilize various statistical processing methodologies in determining the calculated latency, such as averaging, normalization, statistical deviations, and the like. For example, the client computing device 102 may keep information corresponding historical measured latency for a specific data flow. Accordingly, the client computing device 102 may utilize a weighted average of the current measured latency and one or more previously measured latencies as the latency value utilized to determine data flow priority. Similarly, the client computing device 102 may filter or otherwise discard any determined latency that is beyond an expected value, such as an extremely low latency value that has been configured to be beyond the minimal expected latency. Such deviations may be considered by the first computing device to more indicative of an error condition than an accurate representation of data flow latency.

In other embodiments, the client computing device 102 can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the first computing device (or the data flow service) can maintain historical information regarding the performance of particular data flows or historical variations in performance of data flows. In this embodiment, the client computing device 102 can apply weighting factor(s) to the received information to either increase or decrease the determined information. By way of example, the client computing device 102 (or other service) may adjust the ranking of a data flow based on historical performance information indicative of dropped data communication packets or required resets in communications. In another example, the client computing device 102 (or other service) may also consider a financial cost or performance cost associated with selection of particular data flows as part of the prioritization. In still another embodiment, the client computing device 102 may also consider various service level agreements or other performance characteristics in determining a data flow priority.

In other embodiments, the client computing device 102 can apply various thresholds of latency to eliminate any data flows not meeting the threshold. The client computing device 102 can then prioritize the data flows. With reference to the previous examples discussed above, the client computing device 102 can select from data flows satisfying the performance threshold utilizing additional information, random selection, or other selection methods. For example, the client computing device 102 can maintain a minimum latency threshold such that any established data flow not meeting the latency threshold would be excluded from consideration as the selected data flow.

In addition to the prioritization of the data flows, at (5), the client computing device 102 selects one or more data flows based on the prioritization information. Illustratively, the client computing device 102 can select the data flow or data flows in order on the prioritized list. The selection of an established data flow or set of data flows can be considered to be dynamic relative to the static consideration of criteria utilized as part of the creation of the data flow. In still other embodiments, if thresholds are utilized, the first computing device can utilize additional information or random selection to select a data flow as described above.

Turning now to FIG. 3B, in an embodiment, the selection of data flows from multi-path data flows may be directional such that the client computing device 102 (described above) and the target computing device 106 independently implement the multi-path routing processes. In this embodiment, the target computing device 106 can implement the processing without requiring knowledge of the selected data flow or utilizing knowledge of the selected data flow by the client computing device.

With reference to FIG. 3B, at (1), the target computing device 106 establishes a plurality of data flows with the client computing device 102. As previously described, the data flow can be defined in terms of a set of network addresses, a source address and a destination address, a communication port and a communication protocol. Illustratively, the multiple data flows may be established as UDP data flows. Illustratively, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At (2), the target computing device 106 transmits one or more data communications that will elicit a response from the client computing device 102. Illustratively, the elicited response will be utilized by the target computing device 106 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attributes. The target computing device 106 can transmit the probing packet with various tracking or identification information, such as packet identifiers, computing device identifiers, communication type identifiers, and the like. Illustratively, the target computing device 106 does not have to utilize the same probing packet or type of data communication utilized by the client computing device 102.

At (3), the client computing device 102 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the client computing device 102 transmits responsive information.

At (5), the target computing device 106 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attributes of particular data flows. In some embodiments, the first computing device can also maintain timestamp information or other tracking information locally, such as in a table, that facilitates the measure of latency or other communication attributes.

At (5), the target computing device 106 prioritizes the one or more data flows by based on the received information. In one embodiment, the prioritization of data flows may be based on a calculated latency or other network characteristic, such as data throughput, for the particular probing packet transmitted by the first computing device and tracked with a unique identifier. Additionally, in some embodiments, the target computing device 106 may also utilize various statistical processing methodologies in determining the calculated latency, such as averaging, normalization, statistical deviations, and the like. For example, the first computing device may keep information corresponding to historical measured latency for a specific data flow. Accordingly, the target computing device 106 may utilize a weighted average of the current measured latency and one or more previously measured latencies as the latency value utilized to determine data flow priority. Similarly, the target computing device 106 may filter or otherwise discard any determined latency that is beyond an expected value, such as an extremely low latency value that has been configured to be beyond the minimal expected latency. Such deviations may be considered by the target computing device 106 to more indicative of an error condition than an accurate representation of data flow latency.

In other embodiments, the target computing device 106 can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the target computing device 106 (or the data flow service) can maintain historical information regarding the performance of particular data flows or historical variations in performance of data flows. In this embodiment, the target computing device 106 can apply weighing factor(s) to the received information to either increase or decrease the determined information. By way of example, the target computing device 106 (or other service) may adjust the ranking of a data flow based on historical performance information indicative of dropped data communication packets or required resets in communications. In another example, the first computing device (or other service) may also consider a financial cost or performance cost associated with selection of particular data flows as part of the prioritization. In still another embodiment, the target computing device 106 may also consider various service level agreements or other performance characteristics in determining a data flow priority.

In other embodiments, the target computing device 106 can apply various thresholds of latency to eliminate any data flows not meeting the threshold. The target computing device 106 can then prioritize the data flows. With reference to the previous examples discussed above, the first computing device can select from data flow satisfying the performance threshold utilizing additional information, random selection, or other selection methods. For example, the first computing device can maintain a minimum latency threshold such that any established data flow not meeting the latency threshold would be excluded from consideration as the selected data flow.

In addition to the prioritization of the data flows, at (5), the target computing device 106 selects one or more data flows based on the prioritization information. Illustratively, the target computing device 106 can select the data flow or data flows in order on the prioritized list. The selection of an established data flow or set of data flows can be considered to be dynamic relative to the static consideration of criteria utilized as part of the creation of the data flow. In still other embodiments, if thresholds are utilized, the target computing device 106 can utilize additional information or random selection to select a data flow as described above.

Turning now to FIG. 3C, in addition to the selection of a data flow to establish data communications, in some embodiments, the client computing device 102 or target computing device 106 can update the selection of a data flow. FIG. 3C illustrates the update process with regard to the client computing device 102 data flow selection. However, the target computing device 106 may also implement the update process in a similar manner (although not illustrated). With reference to FIG. 3C, at (1), the client computing device 102 conducts a test to determine whether a refresh event should occur or has occurred. Illustratively, a determination of a refresh event or a detection of a refresh event can cause repetition of the multi-path routine to determine an updated selected data flow or to validate a previously selected data flow. In one embodiment, the determination of a refresh event can be based on evaluation of event criteria, such as a total amount of time elapsed since the previous selection of a data flow, a total amount or threshold amount of data throughput through the selected data flow, a total number of failure events (such as dropped packets) or other network conditions or attributes. For example, the event criteria can correspond to a determination of network congestion (either manually or automatically).

If a refresh event is detected/determined, at (2), the client computing device 102 transmits one or more data communications that will elicit a response from the target computing device 106. Illustratively, the elicited response will be utilized by the client computing device 102 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The client computing device 102 can transmit the probing packet with various tracking or identification, such as packet identifiers, computing device identifiers, communication type identifiers, and the like. In some embodiments, the client computing device 102 can utilize the pre-existing data flows. However, the client computing device 102 may establish new or additional data flows as required.

At (3), the target computing device 106 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the target computing device 106 transmits responsive information.

At (5), the client computing device 102 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the client computing device 102 can also maintain timestamp information or other tracking information locally, such as in a table, that facilitates the measure of latency or other communication attributes.

At (5), the client computing device 102 re-prioritizes the one or more data flows by based on the received information. In one embodiment, the prioritization of data flows may be based on a calculated latency or other network characteristic, such as data throughput, for the particular probing packet transmitted by the client computing device 102 and tracked with a unique identifier. Additionally, in some embodiments, the client computing device 102 may also utilize various statistical processing methodologies in determining the calculated latency, such as averaging, normalization, statistical deviations, and the like. For example, the first computing device may keep information corresponding historical measured latency for a specific data flow. Accordingly, the client computing device 102 may utilize a weighted average of the current measured latency and one or more previously measured latencies as the latency value utilized to determine data flow priority, especially in conducting an update. Similarly, the client computing device 102 may filter or otherwise discard any determined latency that is beyond an expected value, such as an extremely low latency value that has been configured to be beyond the minimal expected latency.

In other embodiments, the client computing device 102 can also consider additional criteria such as length of communication, type of communication, historical information and the like in prioritizing the data flows. In this embodiment, the client computing device 102 can apply weighing factor(s) to the received information to either increase or decrease the determined information. In still another embodiment, the client computing device 102 may also consider various service level agreements or other performance characteristics in determining a data flow priority.

In other embodiments, the client computing device 102 can apply various thresholds of latency to eliminate any data flows not meeting the threshold. The client computing device 102 can then prioritize the data flows. With reference to the previous examples discussed above, the client computing device 102 can select from data flow satisfying the performance threshold utilizing additional information, random selection, or other selection methods. For example, the client computing device 102 can maintain a minimum latency threshold such that any established data flow not meeting the latency threshold would be excluded from consideration as the selected data flow.

In addition to the prioritization of the data flows, at (5), the client computing device 102 selects one or more updated data flows based on the prioritization information. Illustratively, the client computing device 102 can select the data flow or data flows in order on the prioritized list. The selection of an established updated data flow or set of data flows can be considered to be dynamic relative to the static consideration of criteria utilized as part of the creation of the data flow. In still other embodiments, if thresholds are utilized, the first computing device can utilize additional information or random selection to select a data flow as described above. The update process may be repeated any number of times. Additionally, in some embodiments, an update procedure implemented by a client computing device 102 may be independent of an update procedure (in terms of timing and decision) implemented by the target computing device 106.

Figure 4A:
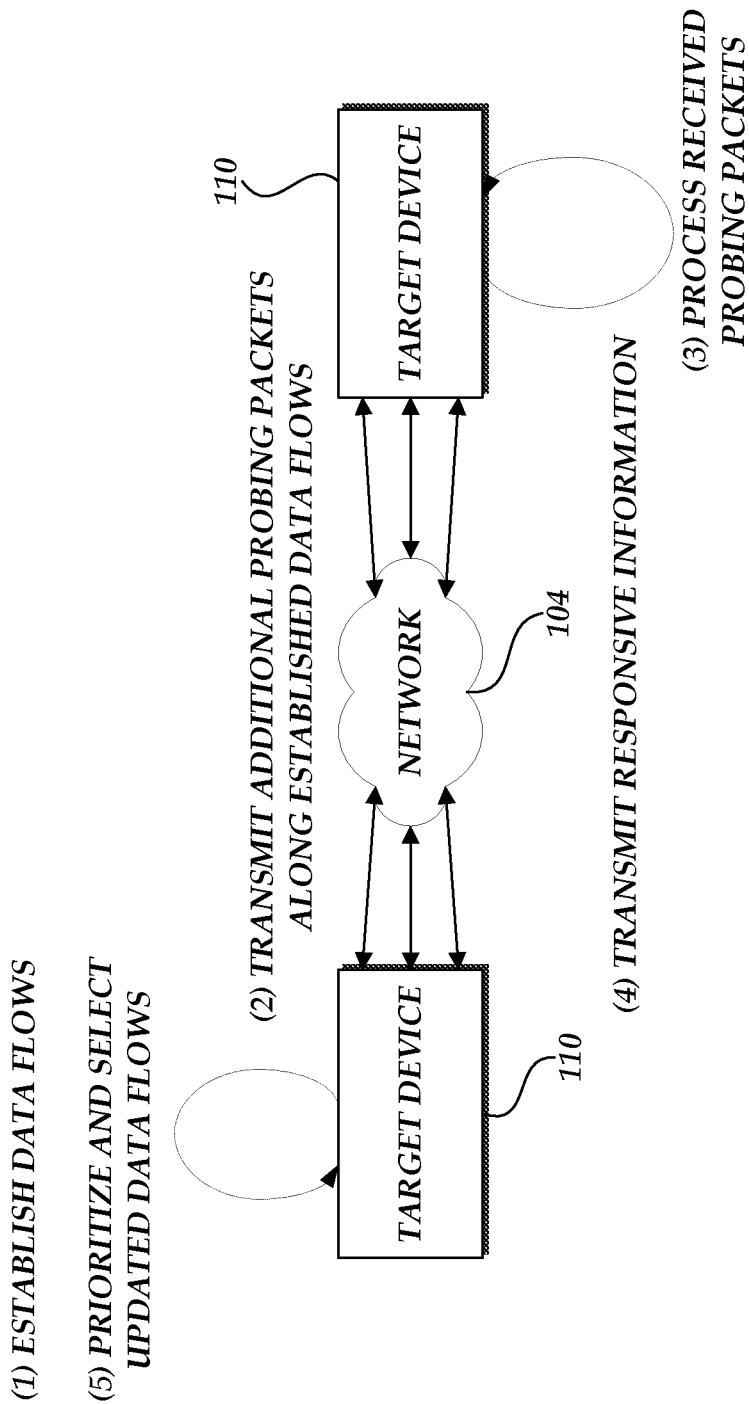
FIGS. 4A-4B are block diagrams of the computing environment of FIG. 1 illustrating the establishment of multi-path routing between two target computing devices along a network.
Figure 4B:
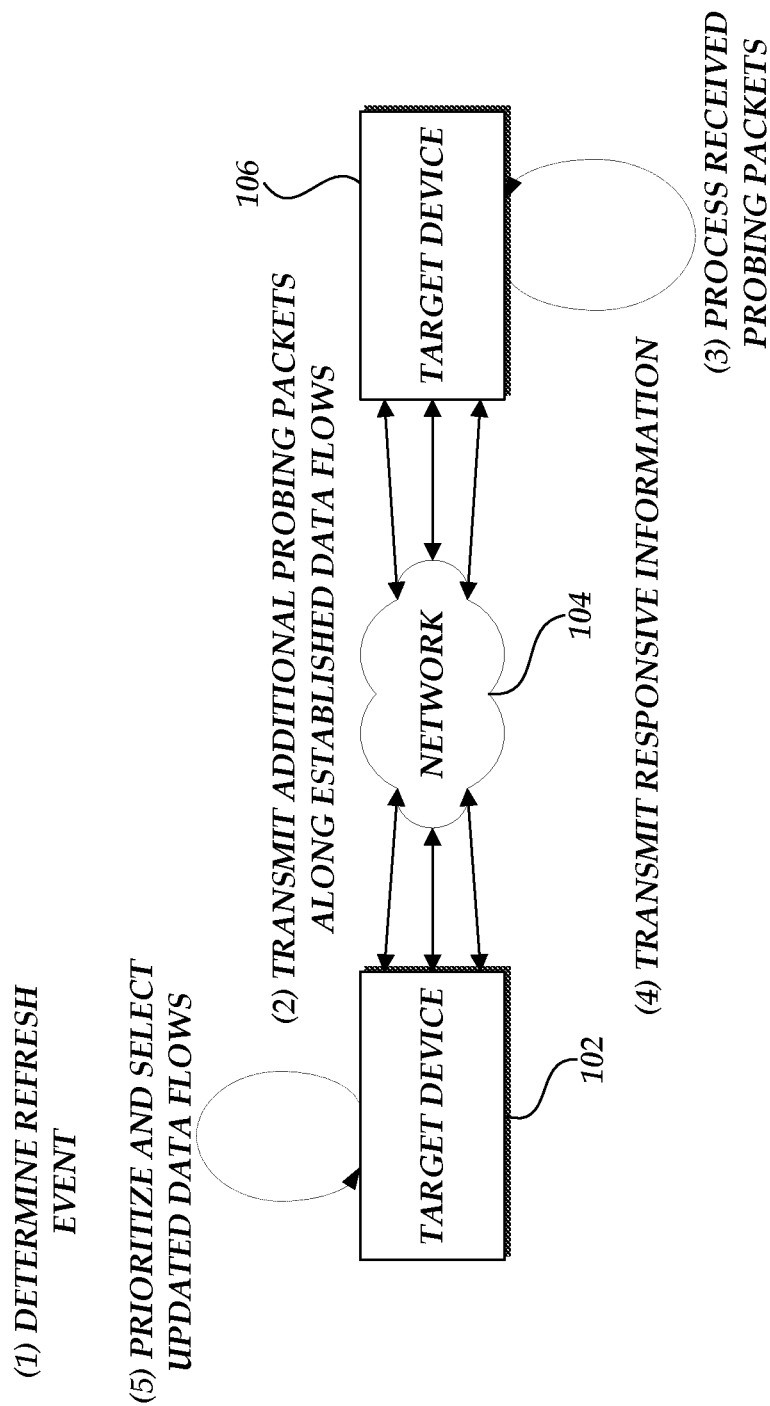

With reference now to FIGS. 4A-4B, an illustrative interaction between target computing devices 110 utilizing multiple data flows will be described. As described with regard to FIG. 1B, the client computing device 102 may be viewed as an originator of a request, such as a multi-media request, that can be fulfilled, at least in part by the target computing device 106, also referred to as a source computing device. Additionally, a network path may be defined and utilized by one or more additional, intermediate target devices having a multi-path server or multi-path service.

With reference to FIG. 4A, at (1), the target computing device 110 establishes a plurality of data flows with a second target computing device 110. As previously described, the data flow can defined in terms of a set of network addresses, a source address and a destination address, a communication port and a communication protocol. Illustratively, the multiple data flows may be established as UDP data flows. Illustratively, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At (2), the target computing device 110 transmits one or more data communications that will elicit a response from the target computing device 110. Illustratively, the elicited response will be utilized by the target computing device 110 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The target computing device 110 can transmit the probing packet with various tracking or identification, such as packet identifiers, computing device identifiers, communication type identifiers, and the like.

At (3), the second target computing device 110 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the second target computing device 110 transmits responsive information.

At (5), the target computing device 110 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the target computing device 110 can also maintain timestamp information or other tracking information locally, such as in a table, that facilitates the measure of latency or other communication attributes.

At (5), the target computing device 110 prioritizes the one or more data flows by based on the received information. In one embodiment, the prioritization of data flows may be based on a calculated latency or other network characteristic, such as data throughput, for the particular probing packet transmitted by the target computing device 110 and tracked with a unique identifier. Additionally, in some embodiments, the target computing device 110 may also utilize various statistical processing methodologies in determining the calculated latency, such as averaging, normalization, statistical deviations, and the like. For example, the target computing device 110 may keep information corresponding historical measured latency for a specific data flow. Accordingly, the target computing device 110 may utilize a weighted average of the current measured latency and one or more previously measured latencies as the latency value utilized to determine data flow priority. Similarly, the client computing device 102 may filter or otherwise discard any determined latency that is beyond an expected value, such as an extremely low latency value that has been configured to be beyond the minimal expected latency. Such deviations may be considered by the first computing device to more indicative of an error condition than an accurate representation of data flow latency.

In other embodiments, the target computing device 110 can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the first computing device (or the data flow service) can maintain historical information regarding the performance of particular data flows or historical variations in performance of data flows. In this embodiment, the target computing device 110 can apply weighing factor(s) to the received information to either increase or decrease the determined information. By way of example, the target computing device 110 (or other service) may adjust the ranking of a data flow based on historical performance information indicative of dropped data communication packets or required resets in communications. In another example, the target computing device 110 (or other service) may also consider a financial cost or performance cost associated with selection of particular data flows as part of the prioritization. In still another embodiment, the target computing device 110 may also consider various service level agreements or other performance characteristics in determining a data flow priority.

In other embodiments, the target computing device 110 can apply various thresholds of latency to eliminate any data flows not meeting the threshold. The target computing device 110 can then prioritize the data flows. With reference to the previous examples discussed above, the target computing device 110 can select from data flow satisfying the performance threshold utilizing additional information, random selection, or other selection methods. For example, the target computing device 110 can maintain a minimum latency threshold such that any established data flow not meeting the latency threshold would be excluded from consideration as the selected data flow.

In addition to the prioritization of the data flows, at (5), the target computing device 110 selects one or more data flows based on the prioritization information. Illustratively, the target computing device 110 can select the data flow or data flows in order on the prioritized list. The selection of an established data flow or set of data flows can be considered to be dynamic relative to the static consideration of criteria utilized as part of the creation of the data flow. In still other embodiments, if thresholds are utilized, the first computing device can utilize additional information or random selection to select a data flow as described above. As previously described with regard to FIG. 1B, the target computing device 110 can also transmit the selection information to a data flow service 120 for purposes of recording the selection or reserving a selected data flow for future utilization.

Although not depicted in FIG. 4A or 4B, in an embodiment, the selection of data flows from multi-path data flows may be directional such that the first target computing device 110 (described above) and the second target computing device 110 independently implements the multi-path routing processes. In this embodiment, the second target computing device 110 can implement the processing without requiring knowledge of the selected data flow or utilizing knowledge of the selected data flow by the client computing device.

Turning now to FIG. 4B, in addition to the selection of a data flow to establish data communications, in some embodiments, the first and second target computing device 110 can update the selection of a data flow. At (1), the target computing device 110 conducts a test to determine whether a refresh event should occur or has occurred. Illustratively, a determination of a refresh event or a detection of refresh event can cause repetition of the multi-path routine to determine an updated selected data flow or to validate a previously selected data flow. In one embodiment, the determination of a refresh event can be based on evaluation of event criteria, such as a total amount of time expired since the previous selection of a data flow, a total amount or threshold amount of data throughput through the selected data flow, a total number of failure events (such as dropped packets) or other network conditions or attributes. For example, the event criteria can correspond to a determination of network congestion (either manually or automatically).

If a refresh event is detected/determined, at (2), the target computing device 110 transmits one or more data communications that will elicit a response from the second target computing device 110. Illustratively, the elicited response will be utilized by the target computing device 110 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The target computing device 110 can transmit the probing packet with various tracking or identification, such as packet identifiers, computing device identifiers, communication type identifiers, and the like. In some embodiments, the target computing device 110 can utilize the pre-existing data flows. However, the target computing device 110 may establish new or additional data flows as required.

At (3), the second target computing device 110 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the second target computing device 110 transmits responsive information.

At (5), the target computing device 110 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the target computing device 110 can also maintain timestamp information or other tracking information locally, such as in a table, that facilitates the measure of latency or other communication attributes.

At (5), the target computing device 110 re-prioritizes the one or more data flows by based on the received information. In one embodiment, the prioritization of data flows may be based on a calculated latency or other network characteristic, such as data throughput, for the particular probing packet transmitted by the target computing device 110 and tracked with a unique identifier. Additionally, in some embodiments, the target computing device 110 may also utilize various statistical processing methodologies in determining the calculated latency, such as averaging, normalization, statistical deviations, and the like. For example, the first computing device may keep information corresponding historical measured latency for a specific data flow. Accordingly, the client computing device 102 may utilize a weighted average of the current measured latency and one or more previously measured latencies as the latency value utilized to determine data flow priority, especially in conducting an update. Similarly, the target computing device 110 may filter or otherwise discard any determined latency that is beyond an expected value, such as an extremely low latency value that has been configured to be beyond the minimal expected latency.

In other embodiments, the target computing device 110 can also consider additional criteria such as length of communication, type of communication, historical information and the like in prioritizing the data flows. In this embodiment, the client computing device 102 can apply weighing factor(s) to the received information to either increase or decrease the determined information. In still another embodiment, the client computing device 102 may also consider various service level agreements or other performance characteristics in determining a data flow priority.

In other embodiments, the target computing device 110 can apply various thresholds of latency to eliminate any data flows not meeting the threshold. The target computing device 110 102 can then prioritize the data flows. With reference to the previous examples discussed above, the target computing device 110 can select from data flow satisfying the performance threshold utilizing additional information, random selection, or other selection methods. For example, the target computing device 110 can maintain a minimum latency threshold such that any established data flow not meeting the latency threshold would be excluded from consideration as the selected data flow.

In addition to the prioritization of the data flows, at (5), the target computing device 110 selects one or more updated data flows based on the prioritization information. Illustratively, the target computing device 110 can select the data flow or data flows in order on the prioritized list. The selection of an established updated data flow or set of data flows can be considered to be dynamic relative to the static consideration of criteria utilized as part of the creation of the data flow. In still other embodiments, if thresholds are utilized, the first computing device can utilize additional information or random selection to select a data flow as described above. The update process may be repeated any number of times. Additionally, in some embodiments, an update procedure implemented by the first target computing device 110 may be independent of an update procedure (in terms of timing and decision) implemented by the second target computing device 110.

Figure 5A:
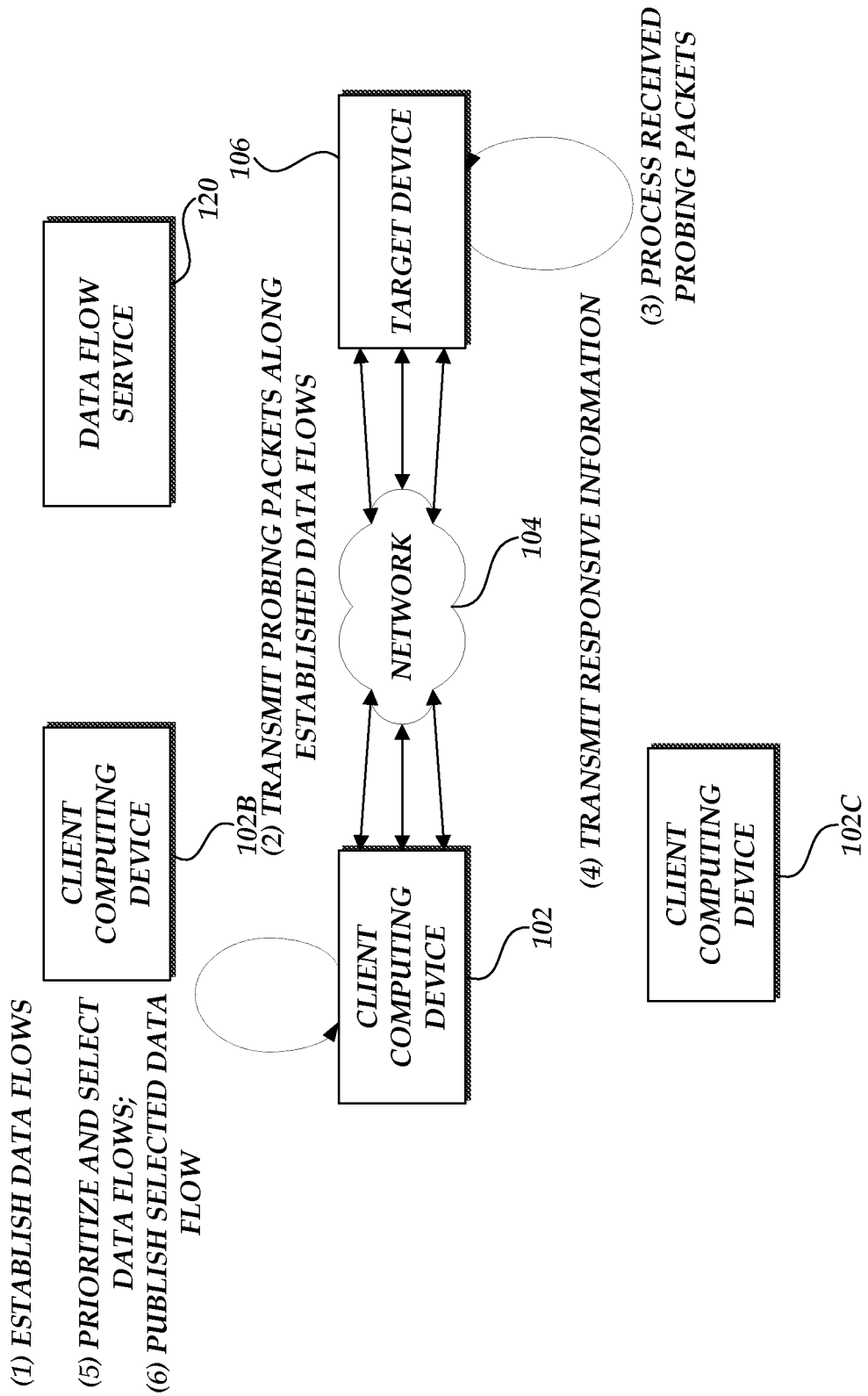
FIGS. 5A-5B are block diagrams of the computing environment of FIG. 1 illustrating the establishment of multi-path routing between a client computing device and a target device and the utilization of determined multi-path routing information by additional client computing devices.
Figure 5B:
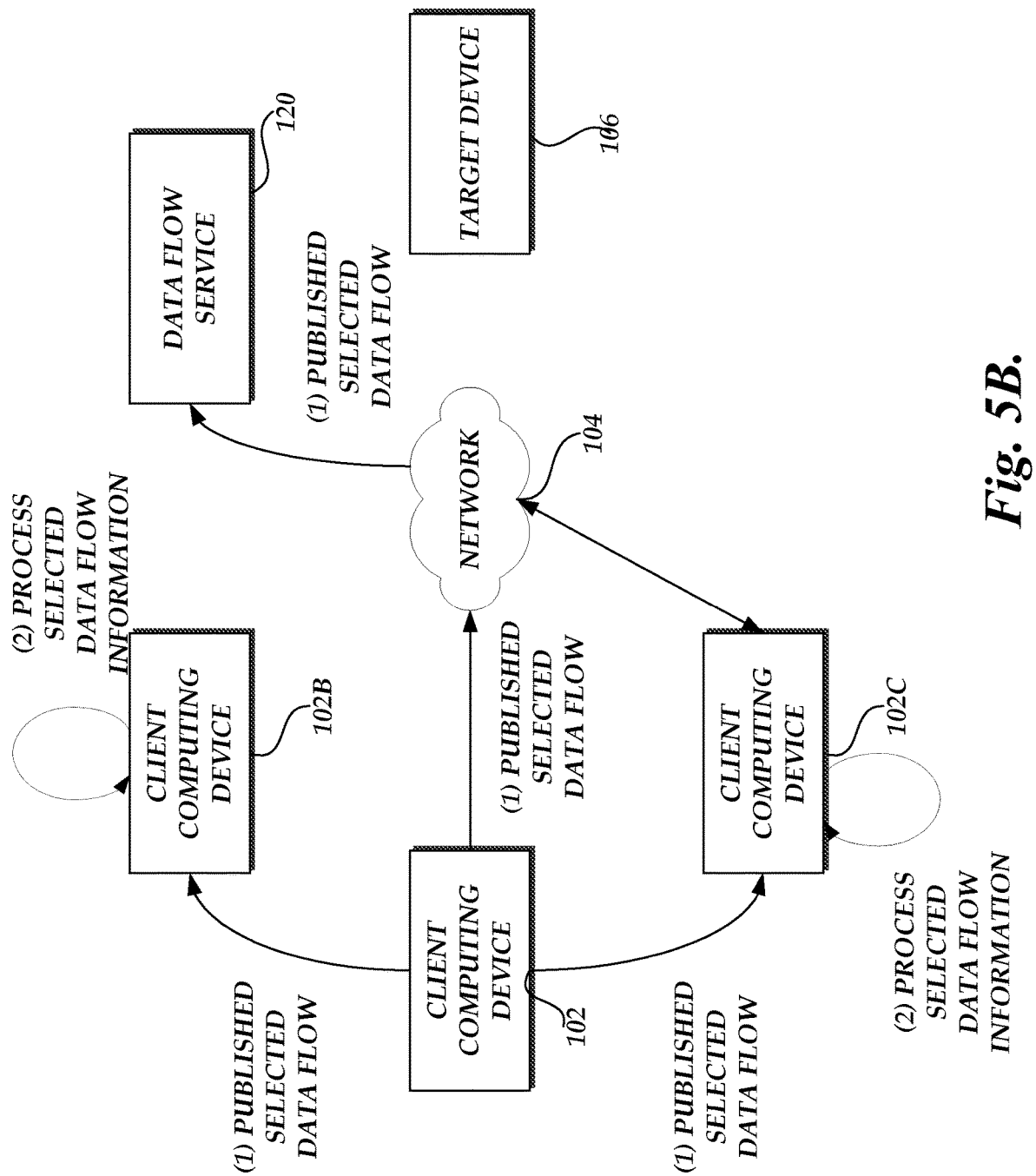

With reference now to FIGS. 5A-5B, an illustrative interaction between multiple client computing devices 102 and a target computing device 106 utilizing multiple data flows will be described. As described with regard to FIGS. 1A and 1C, the client computing device 102 may be viewed as an originator of a request, such as a multi-media request, that can be fulfilled, at least in part by the target computing device 106, also referred to as a source computing device.

With reference to FIG. 5A, at (1), the client computing device 102 establishes a plurality of data flows with the target device 106. As previously described, the data flow can defined in terms of a set of network addresses, a source address and a destination address, a communication port and a communication protocol. Illustratively, the multiple data flows may be established as UDP data flows. Illustratively, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At (2), the client computing device 102 transmits one or more data communications that will elicit a response from the target computing device 106. Illustratively, the elicited response will be utilized by the client computing device 102 to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The client computing device 102 can transmit the probing packet with various tracking or identification, such as packet identifiers, computing device identifiers, communication type identifiers, and the like.

At (3), the target computing device 106 receives the probing packet (or other communication) and processes the request. In some embodiments, the processing of the probing packet can be limited to transmission of a responsive communication, such as a blank or null packet. In other embodiments, the processing of the initial data communication can include the initiation of metric collection processes or requests for information from other data services (not illustrated). At (4), the target computing device 106 transmits responsive information.

At (5), the client computing device 102 receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the client computing device 102 can also maintain timestamp information or other tracking information locally, such as in a table, that facilitates the measure of latency or other communication attributes.

At (5), the client computing device 102 prioritizes the one or more data flows by based on the received information. In one embodiment, the prioritization of data flows may be based on a calculated latency or other network characteristic, such as data throughput, for the particular probing packet transmitted by the client computing device 102 and tracked with a unique identifier. Additionally, in some embodiments, the client computing device 102 may also utilize various statistical processing methodologies in determining the calculated latency, such as averaging, normalization, statistical deviations, and the like. For example, the client computing device 102 may keep information corresponding historical measured latency for a specific data flow. Accordingly, the client computing device 102 may utilize a weighted average of the current measured latency and one or more previously measured latencies as the latency value utilized to determine data flow priority. Similarly, the client computing device 102 may filter or otherwise discard any determined latency that is beyond an expected value, such as an extremely low latency value that has been configured to be beyond the minimal expected latency. Such deviations may be considered by the first computing device to more indicative of an error condition than an accurate representation of data flow latency.

In other embodiments, the client computing device 102 can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the first computing device (or the data flow service) can maintain historical information regarding the performance of particular data flows or historical variations in performance of data flows. In this embodiment, the client computing device 102 can apply weighing factor(s) to the received information to either increase or decrease the determined information. By way of example, the client computing device 102 (or other service) may adjust the ranking of a data flow based on historical performance information indicative of dropped data communication packets or required resets in communications. In another example, the client computing device 102 (or other service) may also consider a financial cost or performance cost associated with selection of particular data flows as part of the prioritization. In still another embodiment, the client computing device 102 may also consider various service level agreements or other performance characteristics in determining a data flow priority.

In other embodiments, the client computing device 102 can apply various thresholds of latency to eliminate any data flows not meeting the threshold. The client computing device 102 can then prioritize the data flows. With reference to the previous examples discussed above, the client computing device 102 can select from data flow satisfying the performance threshold utilizing additional information, random selection, or other selection methods. For example, the client computing device 102 can maintain a minimum latency threshold such that any established data flow not meeting the latency threshold would be excluded from consideration as the selected data flow.

In addition to the prioritization of the data flows, at (5), the client computing device 102 selects one or more data flows based on the prioritization information. Illustratively, the client computing device 102 can select the data flow or data flows in order on the prioritized list. The selection of an established data flow or set of data flows can be considered to be dynamic relative to the static consideration of criteria utilized as part of the creation of the data flow. In still other embodiments, if thresholds are utilized, the first computing device can utilize additional information or random selection to select a data flow as described above. At (6), the client computing device 102 can then publish or otherwise transmit information about the selected data flow or the underlying information utilized to select the data flow.

Turning now to FIG. 5B, the client computing device 102 can publish information regarding the selection of the data flow and any associated meta-data regarding the selected data flow for utilization by the data flow service 120 or one or more peer client computing devices 102B, 102C. In one embodiment, the client computing device 102 transmits or publishes the selected data flow information upon selection. In other embodiments, the first computing device can transmit the information upon request from another computing device or the data flow service 120 or after accumulation of sufficient information.

As previously described, in some embodiments, the client computing devices 102B, 102C can utilize the data flow selection information to establish separate data flows with the target computing device 106 without requiring the additional client computing devices 102B, 102C to implement the multi-path routing processing.

Figure 6A:
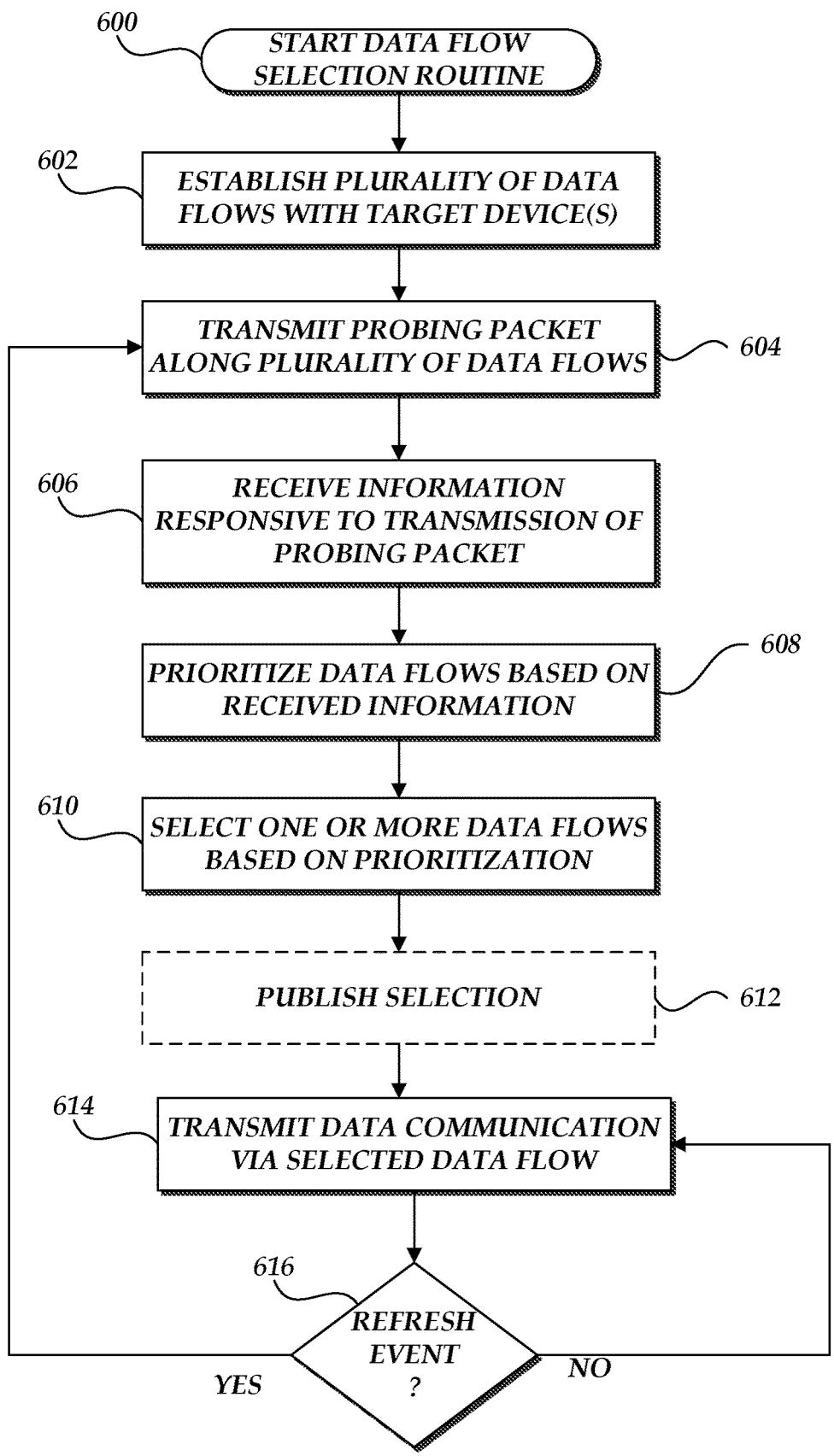
FIG. 6A is a flow diagram of an embodiment of a multi-path routing determination routine implemented by various computing devices.

With reference now to FIG. 6A, a first embodiment of a multi-path processing routine 600 for selecting a data flow for data communications will be described. Illustratively, aspects of routine 600 may be implemented by various computing devices for purposes of selecting a data flow or selecting an updated data flow. In one aspect, routine 600 may be implemented by a computing device, such as a client computing device 200 (FIG. 2A), to select a data flow in a singular direction. In another aspect, routine 600 may be implemented independently by two computing devices in communication to establish bi-directional communications. In this embodiment, each computing device may implement routine 600 without reference to a result of the processing of routine 600 (or similar routine). Still further, as described above, routine 600 may also be implemented by intermediary computing devices for determining data flows along a network, which may be independent of whether the requesting and source computing device are separately implementing multi-path routing. Alternatively, the result of a previous processing may also be utilized by one or more computing devices.

With reference to FIG. 6A, the implementation of routine 600 will be described as implemented by a first computing device that is in communication with a second computing device. At block 602, the first computing device establishes a plurality of data flows with one or more target devices, illustratively a second computing device. As previously described, the data flow can defined in terms of a set of network addresses, a source address and a destination address, a communication port and a communication protocol. Illustratively, the multiple data flows may be established as UDP data flows. Although block 602 is described with regard to establishment of multiple data flows, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At block 604, the first computing device transmits one or more data communications that will elicit a response from the second computing device. Illustratively, the elicited response will be utilized by the first computing device to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The first computing device can transmit the probing packet with various tracking or identification, such as packet identifiers, computing device identifiers, communication type identifiers, and the like.

At block 606, the first computing device receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the first computing device can also maintain timestamp information or other tracking information locally, such as in a table, that facilitates the measure of latency or other communication attributes.

At block 608, the first computing device prioritizes the one or more data flows by based on the received information. In one embodiment, the prioritization of data flows may be based on a calculated latency or other network characteristic, such as data throughput, for the particular probing packet transmitted by the first computing device and tracked with a unique identifier. Additionally, in some embodiments, the first computing device may also utilize various statistical processing methodologies in determining the calculated latency, such as averaging, normalization, statistical deviations, and the like. For example, the first computing device may keep information corresponding historical measured latency for a specific data flow. Accordingly, the first computing device may utilize a weighted average of the current measured latency and one or more previously measured latencies as the latency value utilized to determine data flow priority. Similarly, the first computing device may filter or otherwise discard any determined latency that is beyond an expected value, such as an extremely low latency value that has been configured to be beyond the minimal expected latency. Such deviations may be considered by the first computing device to more indicative of an error condition than an accurate representation of data flow latency.

In other embodiments, the first computing device can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the first computing device (or the data flow service) can maintain historical information regarding the performance of particular data flows or historical variations in performance of data flows. In this embodiment, the first computing device can apply weighing factor(s) to the received information to either increase or decrease the determined information. By way of example, the first computing device (or other service) may adjust the ranking of a data flow based on historical performance information indicative of dropped data communication packets or required resets in communications. In another example, the first computing device (or other service) may also consider a financial cost or performance cost associated with selection of particular data flows as part of the prioritization. In still another embodiment, the first computing device may also consider various service level agreements or other performance characteristics in determining a data flow priority.

In other embodiments, the first computing device can apply various thresholds of latency to eliminate any data flows not meeting the threshold. The first computing device can then prioritize the data flows. With reference to the previous examples discussed above, the first computing device can select from data flow satisfying the performance threshold utilizing additional information, random selection, or other selection methods. For example, the first computing device can maintain a minimum latency threshold such that any established data flow not meeting the latency threshold would be excluded from consideration as the selected data flow.

At block 610, the first computing device selects one or more data flows based on the prioritization information. Illustratively, the first computing device can select the data flow that is on top of the prioritized list. The selection of an established data flow or set of data flows can be considered to be dynamic relative to the static consideration of criteria utilized as part of the creation of the data flow. In other embodiments, the first computing device can select multiple data flows. In still other embodiments, if thresholds are utilized, the first computing device can utilize additional information or random selection to select a data flow as described above. Still further, in other embodiments, the first computing device can select multiple data flows based on the prioritized list.

At block 612, the first computing device can then publish or otherwise transmit information about the selected data flow or the underlying information utilized to select the data flow. In one embodiment, the first computing device can publish information regarding the selection of the data flow and any associated meta-data regarding the selected data flow for utilization by the data flow service 120 or one or more peer client computing devices 102. In one embodiment, the first computing device transmits or publishes the selected data flow information upon selection. In other embodiments, the first computing device can transmit the information upon request from another computing device or the data flow service or after accumulation of sufficient information. One skilled in the relevant art will appreciate that the publication or transmission of the selected data flow information is optional and may be omitted.

At block 614, the first computing device can begin transmitting data communications via the selected data flow. Illustratively, the first computing device utilizes the selected data flow for real time communications transmitted in accordance with the selected communication protocol of the data flow, such as UDP. The first computing device may utilize additional communication components or work in conjunction with additional communication components to cause the transmission of data communications. In some embodiments, the first computing device may also implement routine 600 for purposes of determining a selected data flow without necessarily transmitting any data communication packets subsequent to the determination of a data flow or the transmission of data communications along the selected data flow may be delayed.

Illustratively, the first computing device may conduct a refresh of the selection of a data flow by repeating at least some portion of blocks 604-614. At decision block 616, a test is conducted to determine whether a refresh event has occurred to cause the repetition of portions of routine 600 to determine an updated selected data flow or to validate a previously selected data flow. In one embodiment, the determination of a refresh event can be based on evaluation of event criteria, such as a total amount of time expired since the previous selection of a data flow, a total amount or threshold amount of data throughput through the selected data flow, a total number of failure events (such as dropped packets) or other network conditions or attributes. For example, the event criteria can correspond to a determination of network congestion (either manually or automatically).

In some embodiments, the event criteria can be specified for one or more iterations of routine 600. In other embodiments, each iteration of routine 600 can include a determination of specific event criteria. If the event criteria is not satisfied, the routine 600 returns to block 614, wherein the first computing device can continue transmit along the selected data flow or otherwise designate the selected data flow as available for transmission. If the event criteria is satisfied, the routine 600 returns to block 604 (previously described). Illustratively, the additional iterations of routine 600 may utilize the previously selected data flow such that the first computing device may limit switching to a different data flow if the difference determined performance (or other criteria) is above a threshold or considered statistically significant. In other embodiments, additional iterations of routine 600 may be completely independent with no influence given by a previous iteration of routine 600.

Figure 6B:
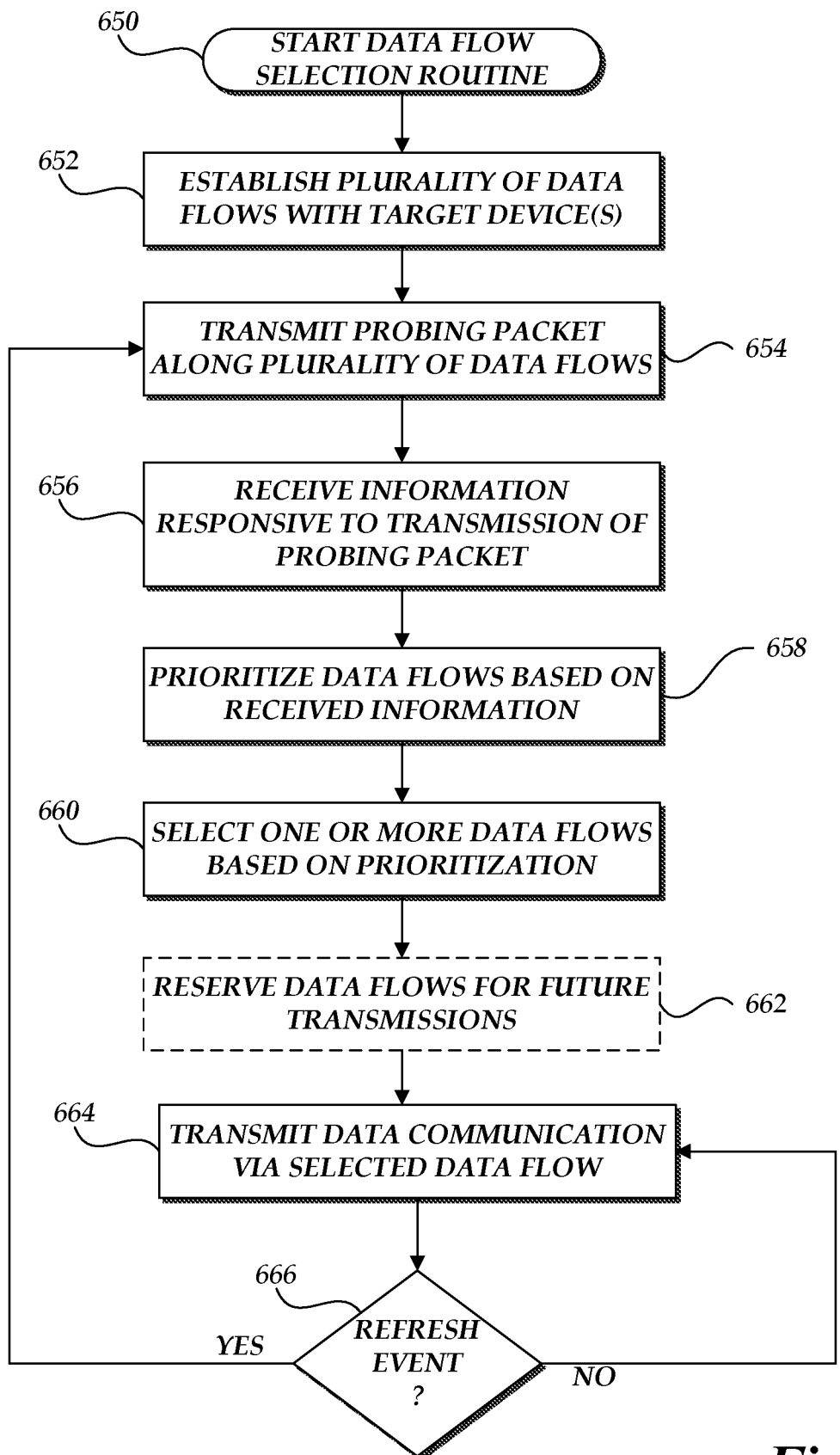
FIG. 6B is a flow diagram of an embodiment of a multi-path routing determination routine implemented by various computing devices.

With reference now to FIG. 6B, a second embodiment of a multi-path processing routine 650 for selecting a data flow for data communications will be described. Illustratively, aspects of routine 650 may be implemented by various computing devices for purposes of selecting a data flow or selecting an updated data flow. In one aspect, routine 650 may be implemented by an intermediate computing device, such as a multi-path server in a networked data center (FIG. 1B). Alternatively, routine 650 may be implemented by other computing devices, such as client computing devices and is not limited solely to implementation by an intermediate computing device or embodiments described with regard to intermediate computing devices.

With reference to FIG. 6B, the implementation of routine 650 will be described as implemented by a first computing device that is in communication with a second computing device. Illustratively, the first and second computing devices may correspond to intermediate computing devices. At block 652, the first computing device establishes a plurality of data flows with one or more target devices, illustratively the second computing device. As previously described, the data flows can defined in terms of a set of network addresses, a source address and a destination address, a communication port and a communication protocol. Illustratively, the multiple data flows may be established as UDP data flows. Although block 652 is described with regard to establishment of multiple data flows, one or more existing data flows may also be utilized. Additionally, as previously described, in accordance with embodiments of the present application, the first computing device can utilize various criteria, often referred to as static criteria, in the establishment of the plurality of data flows. Such static criteria can facilitate the identification of data flows that may be suitable for particular types of data communications, such as real time communications, or that may be better suited between the first and second computing devices, such as based on security protocols, reliability, and the like.

At block 654, the first computing device transmits one or more data communications that will elicit a response from the second computing device. Illustratively, the elicited response will be utilized by the first computing device to measure latency of communication or other communication attributes. As previously described, the transmitted data communication can correspond to a probing packet that is configured to elicit a return data packet in which latency time can be measured. In other embodiments, the data communication can include requests for, or otherwise trigger, a transmission of additional characteristics or measurement information for purposes of measuring latency or other communication attribute. The first computing device can transmit the probing packet with various tracking or identification, such as packet identifiers, computing device identifiers, communication type identifiers, and the like.

At block 656, the first computing device receives information responsive to the transmission of the previously transmitted data communication (e.g., the probing packet). Illustratively, the receipt of information responsive to the transmission of the probing packet can include various identifiers, such as unique packet identifiers, timestamp information, etc., that were included in the transmission of the probing packet or that were otherwise appended based on receipt of the probing packet. The identification information allows the first computing device to measure latency or other communication attribute of particular data flows. In some embodiments, the first computing device can also maintain timestamp information or other tracking information locally, such as in a table, that facilitates the measure of latency or other communication attributes.

At block 658, the first computing device prioritizes the one or more data flows by based on the received information. In one embodiment, the prioritization of data flows may be based on a calculated latency or other network characteristic, such as data throughput, for the particular probing packet transmitted by the first computing device and tracked with a unique identifier. Additionally, in some embodiments, the first computing device may also utilize various statistical processing methodologies in determining the calculated latency, such as averaging, normalization, statistical deviations, and the like. For example, the first computing device may keep information corresponding historical measured latency for a specific data flow. Accordingly, the first computing device may utilize a weighted average of the current measured latency and one or more previously measured latencies as the latency value utilized to determine data flow priority. Similarly, the first computing device may filter or otherwise discard any determined latency that is beyond an expected value, such as an extremely low latency value that has been configured to be beyond the minimal expected latency. Such deviations may be considered by the first computing device to more indicative of an error condition than an accurate representation of data flow latency.

In other embodiments, the first computing device can also consider additional criteria such as length of communication, type of communication, historical information and the like in prioritizing the data flows. For example, particular types of communications requiring consistent connections or having specific security requirements may indicate a preference for a specific communication port. Accordingly, the data flow corresponding to this communication port would be prioritized. In another example, the first computing device (or the data flow service) can maintain historical information regarding the performance of particular data flows or historical variations in performance of data flows. In this embodiment, the first computing device can apply weighing factor(s) to the received information to either increase or decrease the determined information. By way of example, the first computing device (or other service) may adjust the ranking of a data flow based on historical performance information indicative of dropped data communication packets or required resets in communications. In another example, the first computing device (or other service) may also consider a financial cost or performance cost associated with selection of particular data flows as part of the prioritization. In still another embodiment, the first computing device may also consider various service level agreements or other performance characteristics in determining a data flow priority.

In other embodiments, the first computing device can apply various thresholds of latency to eliminate any data flows not meeting the threshold. The first computing device can then prioritize the data flows. With reference to the previous examples discussed above, the first computing device can select from data flow satisfying the performance threshold utilizing additional information, random selection, or other selection methods. For example, the first computing device can maintain a minimum latency threshold such that any established data flow not meeting the latency threshold would be excluded from consideration as the selected data flow.

At block 660, the first computing device selects one or more data flows based on the prioritization information. Illustratively, the first computing device can select the data flow that is on top of the prioritized list. The selection of an established data flow or set of data flows can be considered to be dynamic relative to the static consideration of criteria utilized as part of the creation of the data flow. In other embodiments, the first computing device can select multiple data flows. In still other embodiments, if thresholds are utilized, the first computing device can utilize additional information or random selection to select a data flow as described above. Still further, in other embodiments, the first computing device can select multiple data flows based on the prioritized list.

At block 662, the first computing device can then reserve one or more data flows for future transmission. Illustratively, the first computing device may implement aspects of routine 650 for purposes of selecting data flows for possible current data transmissions and possible future data transmission. Accordingly, in one embodiment, that selecting of the one or more data flows at block 660 may entail the selection of a future desired data flow. Accordingly, the first computing device can transmit the selection to a service, such as data flow service 120, that manages data flow connections between the computing devices.

At block 664, the first computing device can begin transmitting data communications via the selected data flow. Illustratively, the first computing device utilizes the selected data flow for real time communications transmitted in accordance with the selected communication protocol of the data flow, such as ODP. The first computing device may utilize additional communication components or work in conjunction with additional communication components to cause the transmission of data communications. In some embodiments, the first computing device may also implement routine 600 for purposes of determining a selected data flow without necessarily transmitting any data communication packets subsequent to the determination of a data flow or the transmission of data communications along the selected data flow may be delayed.

Illustratively, the first computing device may conduct a refresh of the selection of d data flow by repeating at least some portion of blocks 654-664. At decision block 666, a test is conducted to determine whether a refresh event has occurred to cause the repetition of portions of routine 600 to determine an updated selected data flow or to validate a previously selected data flow. In one embodiment, the determination of a refresh event can be based on evaluation of event criteria, such as a total amount of time expired since the previous selection of a data flow, a total amount or threshold amount of data throughput through the selected data flow, a total number of failure events (such as dropped packets) or other network conditions or attributes. For example, the event criteria can correspond to a determination of network congestion (either manually or automatically).

In some embodiments, the event criteria can be specified for one or more iterations of routine 600. In other embodiments, each iteration of routine 650 can include a determination of specific event criteria. If the event criteria is not satisfied, the routine 650 returns to block 664, wherein the first computing device can continue transmit along the selected data flow or otherwise designate the selected data flow as available for transmission. If the event criteria is satisfied, the routine 650 returns to block 604 (previously described). Illustratively, the additional iterations of routine 650 may utilize the previously selected data flow such that the first computing device may limit switching to a different data flow if the difference determined performance (or other criteria) is above a threshold or considered statistically significant. In other embodiments, additional iterations of routine 650 may be completely independent with no influence given by a previous iteration of routine 650.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a first computing device comprising one or more processors configured with processor-executable instructions to perform operations comprising establishing real time communications with a second computing device; and
a plurality of intermediate computing devices each corresponding to a physical point of presence in a wide area network implemented by a first service provider, the plurality of intermediate computing devices comprising one or more processors configured with processor-executable instructions to perform operations comprising:
obtaining, from at least one external source, historical performance information regarding a plurality of historical data flows with the first computing device, the historical performance information including a plurality of previously measured latencies of a first data flow of the plurality of historical data flows;
selecting the first data flow from a plurality of established data flows between the first computing device and the second computing device based at least in part on the historical performance information, wherein each of the plurality of established data flows corresponds to a different intermediate computing device of the plurality of intermediate computing devices;
monitoring transmission of at least one data communication along each of the plurality of established data flows;
receiving information from the first computing device or the second computing device, the information responsive to processing the at least one data communication along one or more of the plurality of established data flows; and
selecting a second data flow from the plurality of established data flows based at least in part on the historical performance information and the information received from the first computing device or the second computing device.

2. The system of claim 1, wherein the plurality of historical data flows includes the first data flow or the second data flow.

3. The system of claim 1, wherein the plurality of intermediate computing devices is further configured with processor-executable instructions to perform operations comprising:
determining a plurality of data flows to establish based at least in part on the plurality of historical data flows; and
establishing the plurality of data flows to form the plurality of established data flows.

4. The system of claim 3, wherein the plurality of data flows to establish is a subset of the plurality of historical data flows.

5. The system of claim 3, wherein the plurality of data flows to establish is determined based at least in part on a latency threshold.

6. The system of claim 1, wherein the plurality of intermediate computing devices is further configured with processor-executable instructions to perform operations comprising filtering the information received from the first computing device or the second computing device.

7. The system of claim 1, wherein the second data flow is selected based at least in part on a duration of communication, type of communication, service level agreement, financial cost, or performance cost.

8. The system of claim 1, wherein the plurality of intermediate computing devices is further configured with processor-executable instructions to perform operations comprising publishing information regarding selecting the second data flow.

9. A computer-implemented method comprising:
obtaining, by a plurality of intermediate computing devices, shared historical performance information regarding a plurality of data flows between a source computing device and a target computing device, the shared historical performance information including a plurality of previous measurements of a first performance metric for a first data flow of the plurality of data flows, wherein each of the plurality of data flows is defined by a set of network addresses, a transmission port, and a protocol specification, wherein each of the plurality of data flows corresponds to a different intermediate computing device of the plurality of intermediate computing devices, and wherein each of the plurality of intermediate computing devices corresponds to a different physical point of presence in a wide area network implemented by a first service provider;

selecting, by the plurality of intermediate computing devices, the first data flow from the plurality of data flows based at least in part on the historical performance information;

reserving, by the plurality of intermediate computing devices, one or more network resources associated with the first data flow;

monitoring, by the plurality of intermediate computing devices, transmission at least one probing packet along each of the plurality of data flows;

obtaining, by the plurality of intermediate computing devices, information from the source computing device or the target computing device, the information responsive to receipt of the at least one probing packet along one or more of the plurality of data flows;

selecting, by the plurality of intermediate computing devices, a second data flow from the plurality of data flows based, at least in part, on the historical performance information and the information responsive to the receipt of the at least one probing packet;

transmitting, by the plurality of intermediate computing devices, additional data communications between the source computing device and the target computing device via the second data flow; and updating, by the plurality of intermediate computing devices, the historical performance information based at least in part on the information responsive to receipt of the at least one probing packet.

10. The computer-implemented method of claim 9, wherein the historical performance information comprises information regarding latency, throughput, failure events, or a measure of network congestion.

11. The computer-implemented method of claim 9, wherein the second data flow is selected based at least in part on a weighted average of the information from the source computing device and the historical performance information.

12. The computer-implemented method of claim 9 further comprising publishing, by the plurality of intermediate computing devices, information regarding selection of the second data flow to a second computing device.

13. The computer-implemented method of claim 9 further comprising publishing, by the plurality of intermediate computing devices, information regarding selection of the second data flow to a data flow service.

14. The computer-implemented method of claim 9 further comprising reserving, by the plurality of intermediate computing devices, one or more network resources associated with the second data flow.

15. A system comprising:

a plurality of intermediate devices each corresponding to a different physical point of presence in a network implemented by a first service provider, the plurality of intermediate devices comprising one or more processors configured with computer-executable instructions to perform operations including:

monitoring a data communication between a source device and a target device along each of a plurality of established data flows, wherein each of the plurality of established data flows is defined by a set of network addresses, a transmission port, and a protocol specification, and wherein each of the plurality of established data flows corresponds to a different intermediate device of the plurality of intermediate devices;

processing the data communications to generate information regarding the plurality of established data flows;

selecting a data flow from the plurality of established data flows based at least in part on the generated information regarding the plurality of established data flows and historical performance information regarding the plurality of established data flows, wherein the historical performance information corresponds to shared historical performance information provided by an external source, and wherein the shared historical performance information includes a plurality of measurements of a performance metric for the selected data flow; and transmitting information that identifies the selected data flow to at least one of the source device and the target device.

16. The system of claim 15, wherein the operations further comprise filtering the generated information regarding the plurality of established data flows to exclude information regarding at least one established data flow.

17. The system of claim 15, wherein the operations further comprise prioritizing the plurality of established data flows based at least in part on the generated information and the historical performance information.

18. The system of claim 17, wherein selecting the data flow comprises selecting a data flow having a highest priority of the prioritized plurality of established data flows.

19. The system of claim 15, wherein the operations further comprise reserving one or more resources associated with the data flow.

* * * * *